United States Patent
Schaefer

(10) Patent No.: US 11,925,132 B2
(45) Date of Patent: Mar. 12, 2024

(54) METHODS, APPARATUS, AND ARTICLES OF MANUFACTURE TO GENERATE ACQUISITION PATHS

(71) Applicant: Deere & Company, Moline, IL (US)

(72) Inventor: Simon W. Schaefer, Des Moines, LA (US)

(73) Assignee: Deere & Company, Moline, IL (US)

( * ) Notice: Subject to any disclaimer, the term of this patent is extended or adjusted under 35 U.S.C. 154(b) by 282 days.

(21) Appl. No.: 17/364,347

(22) Filed: Jun. 30, 2021

(65) Prior Publication Data

US 2023/0000004 A1  Jan. 5, 2023

(51) Int. Cl.
*A01B 69/00* (2006.01)
*A01B 69/04* (2006.01)
*G05D 1/00* (2006.01)

(52) U.S. Cl.
CPC ......... *A01B 69/008* (2013.01); *G05D 1/0219* (2013.01); *G05D 1/0278* (2013.01); *G05D 2201/0201* (2013.01)

(58) Field of Classification Search
CPC .................................................. A01B 69/008
See application file for complete search history.

(56) References Cited

U.S. PATENT DOCUMENTS

| | | |
|---|---|---|
| 10,645,858 B2 | 5/2020 | Lawson |
| 2016/0313737 A1 | 10/2016 | Berkemeier |
| 2017/0144702 A1* | 5/2017 | Dang ................ B62D 6/002 |
| 2017/0277192 A1* | 9/2017 | Gupta ................ B60W 30/20 |
| 2017/0293304 A1* | 10/2017 | Dang ................ G01C 21/20 |
| 2017/0357262 A1 | 12/2017 | Dix et al. |
| 2020/0257292 A1 | 8/2020 | Zhao et al. |
| 2022/0204053 A1* | 6/2022 | Taniguchi .......... B60W 60/001 |
| 2022/0250646 A1* | 8/2022 | Kobilarov ......... B60W 50/0097 |

FOREIGN PATENT DOCUMENTS

| | | | | |
|---|---|---|---|---|
| CN | 109253735 A | * | 1/2019 | ........ G01C 21/3446 |
| CN | 110345957 A | * | 10/2019 | ........... B60W 50/00 |
| EP | 3761065 A1 | | 1/2021 | |
| JP | 2004294301 A | * | 10/2004 | |
| JP | 2014069645 A | * | 4/2014 | |
| JP | 2019059441 A | * | 4/2019 | |
| JP | 2020132009 A | * | 8/2020 | |

OTHER PUBLICATIONS

Extended European Search Report and Written Opinion issued in European Patent Application No. 22178039.8, dated Nov. 24, 2022, in 09 pages.

* cited by examiner

*Primary Examiner* — Shelley Chen
(74) *Attorney, Agent, or Firm* — Hanley, Flight & Zimmerman, LLC

(57) ABSTRACT

Methods, apparatus, and articles of manufacture to generate acquisition paths are disclosed. An example apparatus includes input interface circuitry to obtain input data associated with a vehicle, threshold calculation circuitry to calculate, based on the input data, a threshold curvature and a threshold curvature rate of the vehicle, and acquisition path generation circuitry to select a point on a target path of the vehicle, generate an acquisition path from a current position of the vehicle to the point, the acquisition path including at least two curves, and cause storage of the acquisition path in response to the at least two curves satisfying the threshold curvature and the threshold curvature rate.

15 Claims, 14 Drawing Sheets

METHODS, APPARATUS, AND ARTICLES OF MANUFACTURE TO GENERATE ACQUISITION PATHS

FIELD OF THE DISCLOSURE

This disclosure relates generally to vehicle steering and, more particularly, to methods, apparatus, and articles of manufacture to generate acquisition paths.

BACKGROUND

Agricultural vehicles have become increasingly automated. Agricultural vehicles may semi-autonomously or fully-autonomously drive and perform operations on fields using implements for planting, spraying, harvesting, fertilizing, stripping/tilling, etc. These autonomous agricultural vehicles include multiple sensors (e.g., Global Navigation Satellite Systems (GNSS), Global Positioning Systems (GPS), Light Detection and Ranging (LIDAR), Radio Detection and Ranging (RADAR), Sound Navigation and Ranging (SONAR), telematics sensors, etc.) to help navigate without assistance, or with limited assistance, from human users.

SUMMARY

An example apparatus includes input interface circuitry to obtain input data associated with a vehicle. Threshold calculation circuitry is to calculate, based on the input data, a threshold curvature and a threshold curvature rate of the vehicle. Acquisition path generation circuitry is to select a point on a target path of the vehicle, generate an acquisition path from a current position of the vehicle to the point, the acquisition path including at least two curves, and cause storage of the acquisition path in response to the at least two curves satisfying the threshold curvature and the threshold curvature rate.

An example non-transitory computer readable medium includes instructions that, when executed, cause at least one processor to at least obtain input data associated with a vehicle. The at least one processor is to calculate, based on the input data, a threshold curvature and a threshold curvature rate of the vehicle, select a point on a target path of the vehicle, generate an acquisition path from a current position of the vehicle to the point, the acquisition path including at least two curves, and cause storage of the acquisition path in response to the at least two curves satisfying the threshold curvature and the threshold curvature rate.

An example apparatus includes means for obtaining to obtain input data associated with a vehicle, means for calculating to calculate, based on the input data, a threshold curvature and a threshold curvature rate of the vehicle, and means for generating to select a point on a target path of the vehicle, generate an acquisition path from a current position of the vehicle to the point, the acquisition path including at least two curves, and cause storage of the acquisition path in response to the at least two curves satisfying the threshold curvature and the threshold curvature rate.

Figure 1:
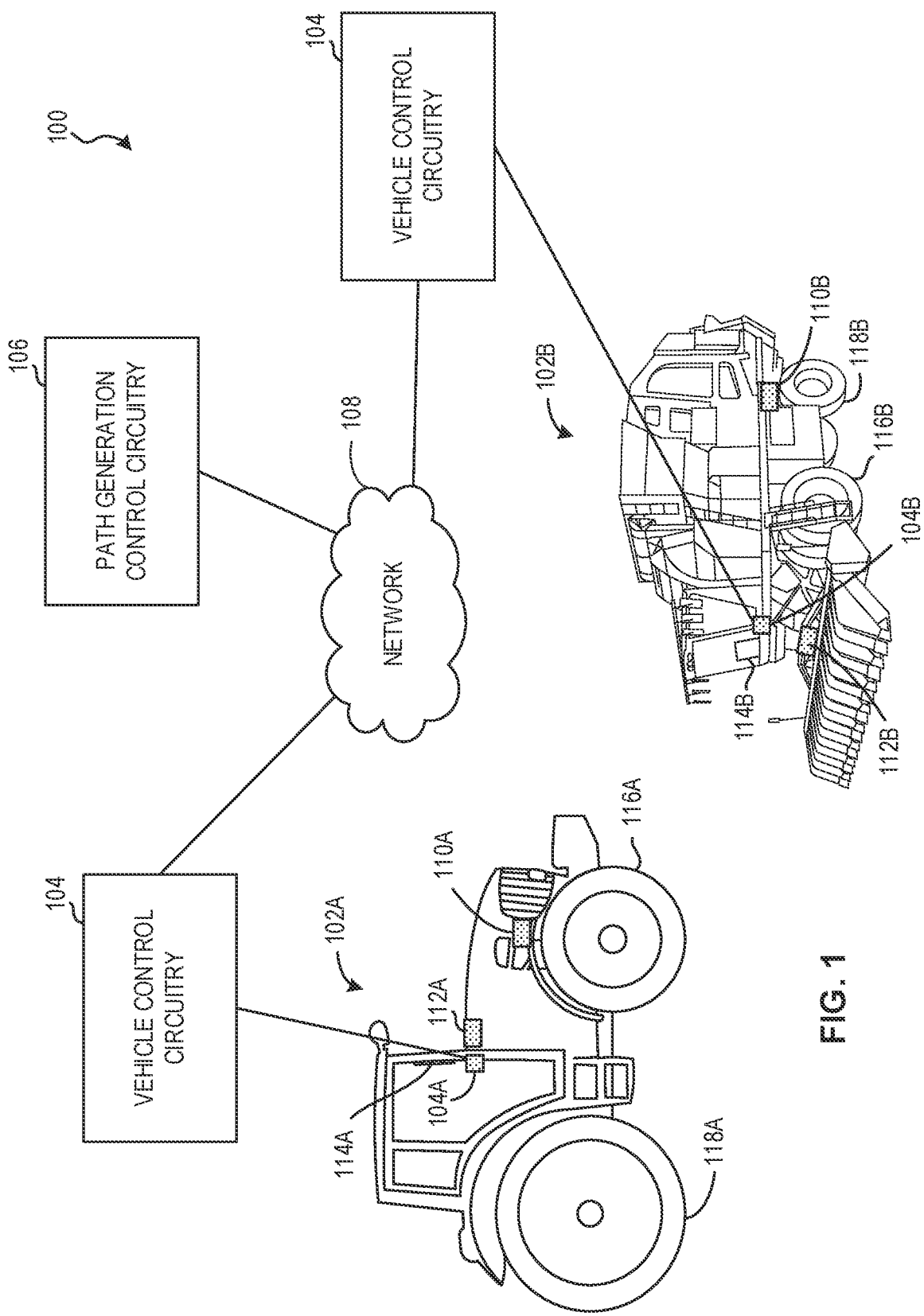
FIG. 1 is a schematic illustration of first and second example vehicles utilizing example vehicle control circuitry and example path generation control circuitry in accordance with teachings of this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Automation of agricultural vehicles is commercially desirable because automation can improve the accuracy with which operations are performed, reduce operator fatigue, improve efficiency, and accrue other benefits. Some automated vehicles include and/or are otherwise enabled for automation functionality, but the user may need to engage and/or disengage the automation functionality. For example, a user could switch a vehicle into an autonomous mode of operation, but the vehicle would not autonomously drive until the user presses a button or toggles a switch to "engage" automation. As such, the vehicle can be referred to as being in a "standby" autonomous mode of operation when automation is enabled but not engaged and in a "fully" autonomous mode of operation when automation is enabled and engaged. In either standby autonomous mode or fully autonomous mode, a user may be present within the vehicle.

Whether in standby autonomous mode or fully autonomous mode, autonomous vehicles include one or more controllers to ensure that the autonomous vehicles traverse terrain properly. In examples disclosed herein, automated vehicles follow guidance paths when in fully autonomous mode. A controller may have many different modes of operation including an acquisition mode of operation and a tracking mode of operation. As used herein, "tracking," "tracking mode," "tracking mode of operation," and/or their derivatives refer to following and/or tracking a guidance path (e.g., in a fully autonomous mode). As used herein, "acquisition," "acquisition mode," "acquisition mode of operation," and/or their derivatives refer to operation when the vehicle is travelling to a guidance path, a path, and/or acquiring a position that is substantially similar to (e.g., within one meter of, within a half meter of, within two meters of, etc.) a guidance path. The path a vehicle takes or may take during acquisition mode is referred to herein as "an acquisition path," and "an acquisition line," among others.

Guidance paths (e.g., target paths) are used by a navigation and/or location apparatus (e.g., a Global Positioning System (GPS) receiver) and a controller in tracking mode to cause a vehicle to follow a prescribed path. In some examples, the prescribed path includes turns, curves, etc., for the vehicle to follow when operating in a field. Conventional controllers, sometimes referred to as guidance systems, allow users of a vehicle to specify a guidance path for the vehicle in the cab. In examples disclosed herein, the heading of a vehicle, also referred to as the yaw of the vehicle, is defined as the direction in which the vehicle is pointing. For example, the heading can be drawn by a straight line, starting from the front of the vehicle and extending in the direction the vehicle is traveling.

Some known guidance systems generate acquisition paths that are not based on a current curvature and/or maneuverability of the vehicle. As such, the acquisition paths generated by some known guidance systems require the vehicle to make sudden and/or rapid changes in direction, which may result in jerking motion of the vehicle and/or an inability of the vehicle to track the acquisition path.

Examples disclosed herein generate example acquisition paths that enable a vehicle to make smooth transitions from a current position to a target path. Examples disclosed herein obtain example input data associated with a vehicle, where the input data includes at least one of the current position, a current heading, a current speed, a wheel angle, a wheel angle rate, or a wheelbase of the vehicle. Examples disclosed herein calculate a threshold curvature and threshold curvature rate based on the input data, and generate one or more acquisition paths between the current position and an acquisition point on the target path that satisfy the threshold curvature and the threshold curvature rate. In some examples, the acquisition paths include a runway portion that tracks a current curvature of the vehicle for a given distance, thereby reducing sudden changes in curvature of the vehicle. Furthermore, the example acquisition paths do not exceed the threshold curvature and/or the threshold curvature rate of the vehicle, thus ensuring that the vehicle is able to traverse the acquisition path.

FIG. 1 is a schematic illustration of an example environment 100 including a first example vehicle 102A and a second example vehicle 102B. In the illustrated example of FIG. 1, the first vehicle 102A utilizes first example vehicle control circuitry 104A, and the second vehicle 102B utilizes second example vehicle control circuitry 104B. In this example, the first and second vehicle control circuitry 104A, 104B are communicatively coupled to example path generation control circuitry 106 via an example network 108. In other examples, the path generation control circuitry 106 may be implemented locally by each of the first and second vehicle control circuitry 104A, 104B.

In the example of FIG. 1, the vehicle control circuitry 104A, 104B guides the first vehicle 102A and the second vehicle 102B, respectively, along one or more guidance paths (e.g., travel paths). The first vehicle 102A includes an example sensor 110A, an example Global Positioning System (GPS) receiver 112A, an example user interface 114A, front wheels (one of which is shown at reference numeral 116A), and rear wheels (one of which is shown at reference numeral 118A).

The second vehicle 102B includes an example sensor 110B, an example Global Positioning System (GPS) receiver 112B, an example user interface 114B, front wheels (one of which is shown at reference numeral 116B), and rear wheels (one of which is shown at reference numeral 118B). As illustrated and described herein, the structure and/or function of any one of the vehicle control circuitry 104B, the sensor 110B, the GPS receiver 112B, the user interface 114B, the front wheels (e.g., the front wheel 116B), and/or the rear wheels (e.g., the rear wheel 118B), may be the same as the corresponding component on the first vehicle 102A. Therefore, for example, description and/or illustration associated with the vehicle control circuitry 104A of the first vehicle 102A can be considered to apply equally to the vehicle control circuitry 104B of the second vehicle 102B.

As used herein, when referring to "the vehicle 102," it is to be understood that the description and/or illustration applies to both the first vehicle 102A and the second vehicle 102B. Similarly, when referring to any one or more of the components of the first vehicle 102A or the second vehicle 102B, if a component is discussed (e.g., the vehicle control circuitry 104, the sensor 110, the GPS receiver 112, the user interface 114, the front wheel 116, the rear wheel 118, etc.), it is to be understood that the illustration and/or description applies to these respective parts on both of the first vehicle 102A and the second vehicle 102B.

In the example illustrated in FIG. 1, the first vehicle 102A is a tractor and the second vehicle 102B is a cotton stripper. However, the first vehicle 102A and the second vehicle 102B may be any type of vehicle (e.g., a tractor, front loader, harvester, cultivator, or any other suitable vehicle) configured to track a projected path and/or curved path. For example, the first vehicle 102A may be a tractor capable of automatically tracking a row of crops to harvest the row of crops. The first vehicle 102A and/or the second vehicle 102B may be a front wheel steer vehicle or a rear wheel steer vehicle. As used herein, a front wheel steer vehicle steers by pivoting its front wheels (such as the front wheel 116A) with respect to a vehicle frame, while a rear wheel steer vehicle steers by pivoting its rear wheels (such as the rear wheel 118B) with respect to a vehicle frame.

In some examples, the vehicle 102 may be implemented as an articulated vehicle that includes a different steering system as compared to front wheel and/or rear wheel steer vehicles. In examples disclosed herein, the vehicle 102 is equipped with the vehicle control circuitry 104 to control and/or otherwise command the vehicle 102 to acquire and/or track a predetermined path.

In the illustrated example of FIG. 1, the first vehicle 102A is implemented as a front wheel steer vehicle. As such, the first vehicle 102A turns in response to pivoting of the front wheel 116A. For example, if the user or an autonomous driving system decides to turn left, the front wheel 116A is pivoted to the left. The second vehicle 102B is implemented as a rear wheel steer vehicle. As such, the second vehicle 102B turns in response to pivoting of the rear wheel 118B. In examples disclosed herein, the front wheels 116A, 116B are located on a front wheel axle with one or more additional corresponding front wheels. Likewise, in examples disclosed herein, the rear wheels 118A, 118B are located on a rear wheel axle with one or more additional corresponding rear wheels.

In the example of FIG. 1, the sensor 110A is associated with the front wheel 116A in the first vehicle 102A, and the sensor 110B is associated with the rear wheel 118B in the second vehicle 102B. The sensor 110 gathers wheel data associated with the front wheel 116 and/or the rear wheel 118. For example, the sensor 110 measures a current wheel angle of the front and/or rear wheels 116, 118 with respect to a vehicle frame or other reference point. In some examples, the sensor 110 samples the current wheel angle at a threshold interval. For example, every 0.1 seconds, the sensor 110 may send the current wheel angle to the vehicle control circuitry 104 and/or the path generation control circuitry 106 for use in generating an acquisition path. In some examples, the sensor 110 can measure a first maximum wheel angle (e.g., a first limiting wheel angle) in the leftward direction and a second maximum wheel angle (e.g., a second limiting wheel angle) in the rightward direction. For example, the vehicle 102 can be turned fully to the left via manual operation by an operator of the vehicle 102, and the sensor 110 measures the first maximum wheel angle when the front and/or rear wheels 116, 118 are turned fully to the left. Similarly, the vehicle 102 can be turned fully to the right via manual operation by the operator, and the sensor 110 measures the second maximum wheel angle when the front and/or rear wheels 116, 118 are turned fully to the right. In some examples, the sensor 110 measures a wheel angle rate of the front and/or rear wheels 116, 118, where the wheel angle rate corresponds to a rate at which the front and/or rear wheels 116, 118 can change direction.

In the illustrated example of FIG. 1, the GPS receiver 112 communicates with the vehicle control circuitry 104 and/or the path generation control circuitry 106 to provide and/or otherwise transmit position data (e.g., a current position and/or speed of the vehicle 102) thereto. In some examples, the GPS receiver 112 samples the current position and/or speed of the vehicle 102 at a threshold interval. For example, every 0.1 seconds, the GPS receiver 112 may send the current position to the vehicle control circuitry 104 and/or the path generation control circuitry 106 for use in generating an acquisition path. In some examples, the GPS receiver 112 determines the current speed of the vehicle 102 based on measured positions of the vehicle 102 over time.

In the illustrated example of FIG. 1, the user interface 114 enables an operator of the vehicle 102 to provide inputs to the vehicle control circuitry 104 and/or the path generation control circuitry 106. In some examples, the user interface 114 is implemented by a liquid crystal display (LCD) touch screen such as a tablet, a computer monitor, etc. In the example of FIG. 1, the user interface 114 is an interactive display on which the operator may select and/or enter desired inputs (e.g., select a screen display, enter desired vehicle speed, select a sampling interval, power on and/or off the vehicle, etc.) before, during, and/or after operation of the vehicle 102. In some examples, the user interface 114 enables the operator to select a desired guidance path (e.g., a target path) from among one or more guidance paths preloaded in the vehicle control circuitry 104.

In the illustrated example of FIG. 1, the vehicle control circuitry 104 is communicatively coupled to the path generation control circuitry 106 via the network 108. In this example, the path generation control circuitry 106 generates one or more acquisition paths to guide the vehicle 102 from the current position to the desired guidance path of the vehicle 102. In some examples, the path generation control circuitry 106 receives input data from the vehicle control circuitry 104, where the input data includes, in some examples, the current position of the vehicle 102, the current heading of the vehicle 102, the current speed of the vehicle 102, the current wheel angle of the front and/or rear wheels 116, 118, the first and second maximum wheel angles, and/or the wheel angle rate. Additionally, the path generation control circuitry 106 obtains a desired guidance path (e.g., target path) from the vehicle control circuitry 104. In some examples, the desired guidance path is selected (e.g., by a user) from one or more guidance paths preloaded on the vehicle control circuitry 104. In some examples, the one or more acquisition paths generated by the path generation control circuitry 106 are used by the vehicle control circuitry 104 to control steering of the vehicle 102 (e.g., by adjusting a rotation speed and/or direction of the front and/or rear wheels 116, 118).

Figure 2:
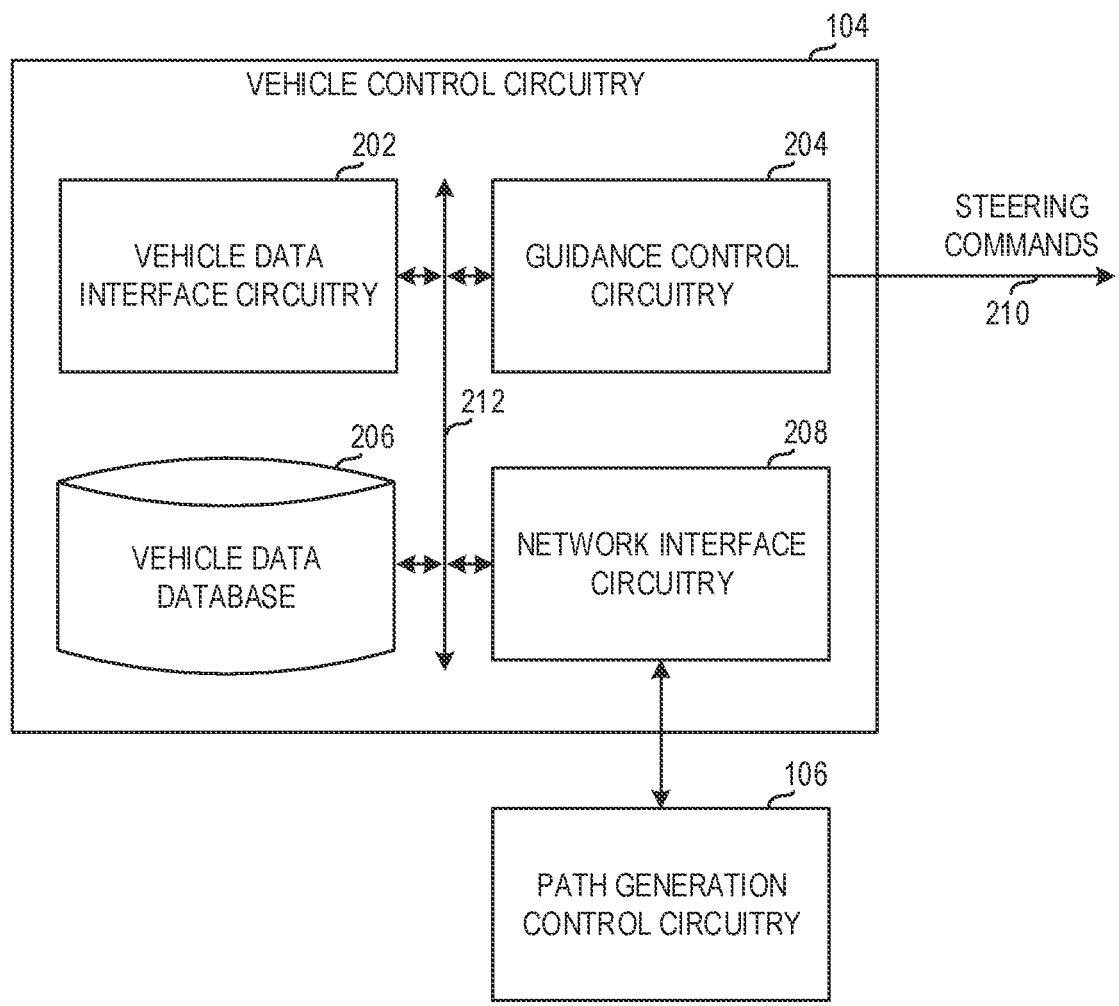
FIG. 2 is a block diagram of the example vehicle control circuitry of FIG. 1.

FIG. 2 is a block diagram of the example vehicle control circuitry 104 of FIG. 1. In the illustrated example of FIG. 2, the vehicle control circuitry 104 includes example vehicle data interface circuitry 202, example guidance control circuitry 204, example vehicle data database 206, and example network interface circuitry 208. In the example of FIG. 2, the guidance control circuitry 204 generates example steering commands 210, and the network interface circuitry 208 is communicatively coupled to the path generation control circuitry 106 via the network 108 of FIG. 1. In the example of FIG. 2, any of the vehicle data interface circuitry 202, the guidance control circuitry 204, the vehicle data database 206, and/or the network interface circuitry 208 can communicate via an example communication bus 212.

In examples disclosed herein, the communication bus 212 may be implemented using any suitable wired and/or wireless communication. In additional or alternative examples, the communication bus 212 includes software, machine readable instructions, and/or communication protocols by which information is communicated among the vehicle data interface circuitry 202, the guidance control circuitry 204, the vehicle data database 206, and/or the network interface circuitry 208.

In the illustrated example of FIG. 2, the vehicle data database 206 stores vehicle data and/or path data utilized and/or obtained by the vehicle control circuitry 104. The example vehicle data database 206 of FIG. 2 is implemented by any memory, storage device and/or storage disc for storing data such as, for example, flash memory, magnetic media, optical media, solid state memory, hard drive(s), thumb drive(s), etc. Furthermore, the data stored in the example vehicle data database 206 may be in any data format such as, for example, binary data, comma delimited data, tab delimited data, structured query language (SQL) structures, etc. While, in the illustrated example, the example vehicle data database 206 is illustrated as a single device, the example vehicle data database 206 and/or any other data storage devices described herein may be implemented by any number and/or type(s) of memories.

In the illustrated example of FIG. 2, the vehicle data interface circuitry 202 provides vehicle data to the guidance control circuitry 204, the vehicle data database 206, and/or the network interface circuitry 208, where the vehicle data includes measurements of vehicle parts of the vehicle 102, distances between relative areas of the vehicle 102, etc. In this example, the vehicle data interface circuitry 202 is communicatively coupled to the user interface 114, the sensor 110, and/or the GPS receiver 112 of FIG. 1 to receive and/or otherwise obtain the vehicle data therefrom. For example, the vehicle data interface circuitry 202 obtains sensor data from the sensor 110 and/or GPS data from the GPS receiver 112, and the vehicle data interface circuitry 202 determines the vehicle data based on the sensor data and/or the GPS data. In some examples, the vehicle data interface circuitry 202 obtains the current position of the vehicle 102 and the current speed of the vehicle 102 from the GPS data, and obtains the current wheel angle of the front and/or rear wheels 116, 118, the maximum wheel angles in a leftward and a rightward direction, and/or the maximum wheel angle rate from the sensor data. In some examples, the vehicle data interface circuitry 202 causes storage of the vehicle data (e.g., including the current position, the current heading, the current speed, the current wheel angle, the maximum wheel angles, and/or the maximum wheel angle rate) in the vehicle data database 206.

In the example of FIG. 2, the example vehicle data interface circuitry 202 accepts user input data that is provided by an operator of the vehicle 102 via the user interface 114. In some examples, the user input data includes preset and/or predetermined values, measurements, and/or distances of the vehicle 102. For example, the user input data includes a wheelbase of the vehicle 102, where the wheelbase corresponds to a distance between a front wheel axis and a rear wheel axis of the vehicle 102. In some examples, the operator can select, via the user interface 114, a target path (e.g., a desired guidance path) from among one or more guidance paths stored in the vehicle data database 206. In some examples, the one or more guidance paths are stored in the vehicle data database 206 prior to operation of the vehicle 102. In some examples, the operator can modify the one or more guidance paths (e.g., add a new guidance path, remove an existing guidance path, modify an existing guidance path, etc.) via the user interface 114. In other examples, the one or more guidance paths can be modified remotely via network communications received by the network interface circuitry 208. In some examples, the vehicle data interface circuitry 202 provides the selected guidance paths from the one or more guidance paths as an input to the guidance control circuitry 204 and/or to the network interface circuitry 208.

In some examples, the vehicle control circuitry 104 includes means for interfacing. For example, the means for interfacing may be implemented by the vehicle data interface circuitry 202. In some examples, the vehicle data interface circuitry 202 may be implemented by machine executable instructions such as that implemented by at least blocks 802, 804, 806, and 808 of FIG. 8 executed by processor circuitry, which may be implemented by the example processor circuitry 1012 of FIG. 10, the example processor circuitry 1200 of FIG. 12, and/or the example Field Programmable Gate Array (FPGA) circuitry 1300 of FIG. 13. In other examples, the vehicle data interface circuitry 202 is implemented by other hardware logic circuitry, hardware implemented state machines, and/or any other combination of hardware, software, and/or firmware. For example, the vehicle data interface circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 2, the network interface circuitry 208 provides vehicle data to and/or receives generated path data from the path generation control circuitry 106. For example, the network interface circuitry 208 communicates with the path generation control circuitry 106 via the network 108 of FIG. 1, and provides the vehicle data and/or the selected target path to the path generation control circuitry 106 via the network 108. Additionally or alternatively, the network interface circuitry 208 receives generated path data from the path generation control circuitry 106 via the network 108, where the generated path data includes an acquisition path generated based on the vehicle data and the selected target path.

In some examples, the vehicle control circuitry 104 includes means for communicating. For example, the means for communicating may be implemented by the network interface circuitry 208. In some examples, the network interface circuitry 208 may be implemented by machine executable instructions such as that implemented by at least blocks 810 and 812 of FIG. 8 executed by processor circuitry, which may be implemented by the example processor circuitry 1012 of FIG. 10, the example processor circuitry 1200 of FIG. 12, and/or the example Field Programmable Gate Array (FPGA) circuitry 1300 of FIG. 13. In other examples, the network interface circuitry 208 is implemented by other hardware logic circuitry, hardware implemented state machines, and/or any other combination of hardware, software, and/or firmware. For example, the network interface circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 2, the guidance control circuitry 204 generates the steering commands 210 based on the target path and the acquisition path from the path generation control circuitry 106. For example, the steering commands 210 cause steering of wheels (e.g., the front wheel 116 and/or the rear wheel 118) of the vehicle 102. In some examples, the steering commands 210 control an angle at which the wheels turn and/or a rotation speed of the wheels to move the vehicle 102 along the acquisition path and/or the target path.

In some examples, the vehicle control circuitry 104 includes means for guiding. For example, the means for guiding may be implemented by the guidance control circuitry 204. In some examples, the guidance control circuitry 204 may be implemented by machine executable instructions such as that implemented by at least block 814 of FIG. 8 executed by processor circuitry, which may be implemented by the example processor circuitry 1012 of FIG. 10, the example processor circuitry 1200 of FIG. 12, and/or the example Field Programmable Gate Array (FPGA) circuitry 1300 of FIG. 13. In other examples, the guidance control circuitry 204 is implemented by other hardware logic circuitry, hardware implemented state machines, and/or any other combination of hardware, software, and/or firmware. For example, the guidance control circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the vehicle control circuitry 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example vehicle data interface circuitry 202, the example guidance control circuitry 204, the example vehicle data database 206, the example network interface circuitry 208 and/or, more generally, the example vehicle control circuitry 104 of FIG. 2 may be implemented by hardware, software, firmware, and/or any combination of hardware, software, and/or firmware. Thus, for example, any of the example vehicle data interface circuitry 202, the example guidance control circuitry 204, the example vehicle data database 206, the example network interface circuitry 208, and/or, more generally, the example vehicle control circuitry 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example vehicle data interface circuitry 202, the example guidance control circuitry 204, the example vehicle data database 206, and/or the example network interface circuitry 208 is/are hereby expressly defined to include a non-transitory computer readable storage device or storage disk such as a memory, a digital versatile disk (DVD), a compact disk (CD), a Blu-ray disk, etc., including the software and/or firmware. Further still, the example vehicle control circuitry 104 of FIG. 1 may include one or more elements, processes, and/or devices in addition to, or instead of, those illustrated in FIG. 2, and/or may include more than one of any or all of the illustrated elements, processes and devices.

Figure 3:
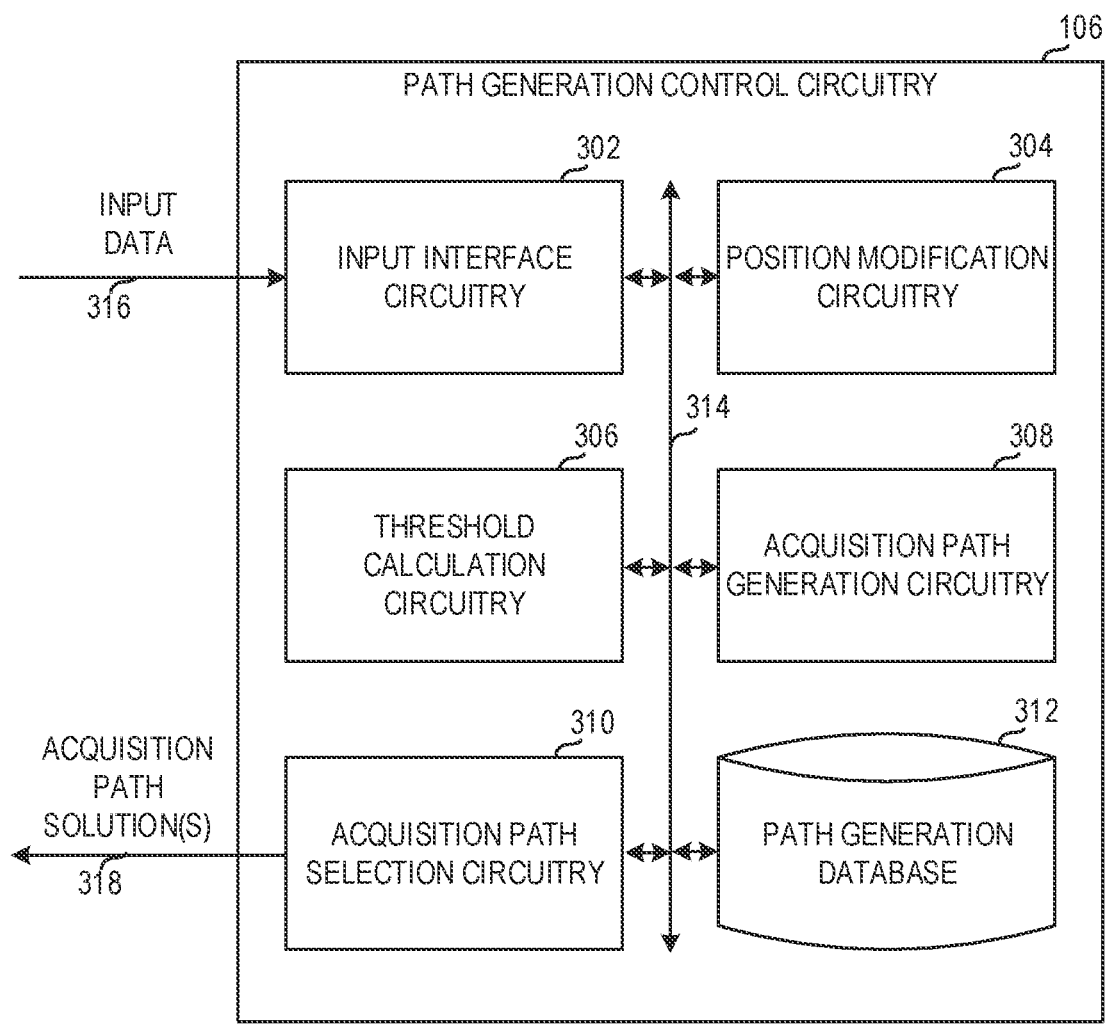
FIG. 3 is a block diagram of the example path generation control circuitry of FIG. 1.

FIG. 3 is a block diagram of the example path generation control circuitry 106 of FIG. 1. In the illustrated example of FIG. 3, the path generation control circuitry 106 includes example input interface circuitry 302, example position modification circuitry 304, example threshold calculation circuitry 306, example acquisition path generation circuitry 308, example acquisition path selection circuitry 310, and example path generation database 312. In the example of FIG. 3, any of the input interface circuitry 302, the position modification circuitry 304, the threshold calculation circuitry 306, the acquisition path generation circuitry 308, the acquisition path selection circuitry 310, and/or the path generation database 312 can communicate via an example communication bus 314.

In examples disclosed herein, the communication bus 314 may be implemented using any suitable wired and/or wireless communication. In additional or alternative examples, the communication bus 314 includes software, machine readable instructions, and/or communication protocols by which information is communicated among the input interface circuitry 302, the position modification circuitry 304, the threshold calculation circuitry 306, the acquisition path generation circuitry 308, the acquisition path selection circuitry 310, and/or the path generation database 312.

The input interface circuitry 302 is communicatively coupled to the network interface circuitry 208 of FIG. 2 to receive and/or otherwise obtain example input data 316 therefrom. In some examples, the input data 316 includes the current position and/or the current speed of the vehicle 102 from the GPS receiver 112 of FIG. 1, the current wheel angle, a first maximum wheel angle (e.g., in a fully leftward turn), a second maximum wheel angle (e.g., in a fully rightward turn), and/or the wheel angle rate from the sensor 110 of FIG. 1. In some examples, the input data 316 includes the user input from the user interface 114 of FIG. 1, such as a value indicating a wheelbase of the vehicle 102. Additionally, the input data 316 includes the target path of the vehicle 102 from the vehicle data database 206 of FIG. 2. In some examples, the target path is selected by the operator of the vehicle 102 from one or more possible target paths via the user interface 114.

In some examples, the path generation control circuitry 106 includes means for obtaining. For example, the means for obtaining may be implemented by the input interface circuitry 302. In some examples, the input interface circuitry 302 may be implemented by machine executable instructions such as that implemented by at least block 902 of FIG. 9 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the input interface circuitry 302 is implemented by other hardware logic circuitry, hardware implemented state machines, and/or any other combination of hardware, software, and/or firmware. For example, the input interface circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 3, the position modification circuitry 304 adjusts the current position of the vehicle 102 based on a runway. In some examples, the runway corresponds to a portion of the path from the current position of the vehicle 102 having the same curvature as a current curvature of the vehicle 102. In some examples, the position modification circuitry 304 determines the current curvature based on the current wheel angle from the sensor data, and/or approximates the current curvature based on the GPS data. In some examples, the runway begins at the current position of the vehicle 102, and an acquisition path is generated at an end of the runway. In some examples, the runway enables the vehicle 102 to track the acquisition path for a length of time (e.g., 2 seconds, 5 seconds) before the curvature of the acquisition path changes. As such, the runway enables smooth transition of the vehicle 102 to the acquisition path (e.g., without sudden changes in the curvature of the path). In one example, a runway distance of the runway is selected by the operator of the vehicle 102 via the user interface 114, and the runway distance is provided in the input data to the input interface circuitry 302. In some examples, the position modification circuitry 304 determines the current position of the vehicle 102 and the current curvature of the vehicle 102 based on the input data. Furthermore, the position modification circuitry 304 projects a runway from the current position, where the runway corresponds to the current curvature and the runway distance from the input data. In some examples, the position modification circuitry 304 determines a starting position of the acquisition path based on the runway. For example, the starting position corresponds to the end of the runway, and the position modification circuitry 304 adjusts and/or otherwise updates the current position of the vehicle 102 to correspond to the starting position. In some examples, the path generation control circuitry 106 generates the acquisition path based on the updated current position instead of an actual current position of the vehicle 102.

In some examples, the path generation control circuitry 106 includes means for adjusting. For example, the means for adjusting may be implemented by the position modification circuitry 304. In some examples, the position modification circuitry 304 may be implemented by machine executable instructions such as that implemented by at least block 906 of FIG. 9 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the position modification circuitry 304 is implemented by other hardware logic circuitry, hardware implemented state machines, and/or any other combination of hardware, software, and/or firmware. For example, the position modification circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 3, the threshold calculation circuitry 306 calculates a threshold curvature (e.g., a limiting curvature) and/or a threshold curvature rate (e.g., a limiting curvature rate) based on the input data. In examples disclosed herein, the threshold curvature corresponds to a highest curvature of a path along which the vehicle 102 can travel given the current speed of the vehicle 102, and the threshold curvature rate corresponds to a rate at which the vehicle 102 can change curvature at a given wheel angle. In this example, the threshold calculation circuitry 306 calculates the threshold curvature using a simple bicycle model based on the machine wheelbase, the current speed of the vehicle 102, and the wheel angle rate from the input data. Furthermore, the threshold calculation circuitry 306 calculates the threshold curvature rate by linearizing the simple bicycle model at a wheel angle of zero degrees. In such examples, the threshold calculation circuitry 306 calculates a derivative of the linearized simple bicycle model, where the derivative corresponds to the threshold curvature rate. In some examples, the threshold calculation circuitry 306 provides the threshold curvature and the threshold curvature rate to the acquisition path generation circuitry 308 for generating one or more acquisition paths based on the threshold curvature and/or the threshold curvature rate. In some examples, the threshold calculation circuitry 306 provides the threshold curvature and/or the threshold curvature rate to the path generation database 312 for storage therein.

In some examples, the path generation control circuitry 106 includes means for calculating. For example, the means for calculating may be implemented by the threshold calculation circuitry 306. In some examples, the threshold calculation circuitry 306 may be implemented by machine executable instructions such as that implemented by at least block 904 of FIG. 9 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the threshold calculation circuitry 306 is implemented by other hardware logic circuitry, hardware implemented state machines, and/or any other combination of hardware, software, and/or firmware. For example, the threshold calculation circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 3, the acquisition path generation circuitry 308 generates one or more acquisition paths based on the input data and the target path of the vehicle 102. For example, the acquisition path generation circuitry 308 selects a first acquisition point (e.g., an initial acquisition point, a starting acquisition point) on the target path. In some examples, the first acquisition point is a point on the target path that is closest to the vehicle 102. The acquisition path generation circuitry 308 generates a first candidate acquisition path from the current position of the vehicle to the first acquisition point. In some examples, the acquisition path generation circuitry 308 generates the first candidate acquisition path using two curves, where the two curves satisfy the threshold curvature and the threshold curvature rate calculated by the threshold calculation circuitry 306.

In some examples, the path generation control circuitry 106 includes means for generating. For example, the means for generating may be implemented by the acquisition path generation circuitry 308. In some examples, the acquisition path generation circuitry 308 may be implemented by machine executable instructions such as that implemented by at least blocks 908, 910, 912, 914, 922, 926, and 928 of FIG. 9 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the acquisition path generation circuitry 308 is implemented by other hardware logic circuitry, hardware implemented state machines, and/or any other combination of hardware, software, and/or firmware. For example, the acquisition path generation circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, in response to the acquisition path generation circuitry 308 being unable to generate the first candidate acquisition path between the current position and the first acquisition point that satisfies the threshold curvature and threshold curvature rate, the acquisition path generation circuitry 308 selects a second acquisition point along the target path different from the first acquisition point. In such examples, the acquisition path generation circuitry 308 generates a second candidate acquisition path between the current position of the vehicle 102 and the second acquisition point. In some such examples, the second acquisition point is further from the vehicle 102 than the first acquisition point. In some examples, the acquisition path generation circuitry 308 copies a portion of the target path and adds the copied portion to an end of the second candidate acquisition path at the second acquisition point. In some examples, the copied portion enables the second acquisition path to match the target path at the second acquisition point, thus enabling smooth transition of the vehicle 102 from the second acquisition path to the target path.

In the illustrated example of FIG. 3, in response to the second candidate acquisition path being successful (e.g., satisfying the threshold curvature and the threshold curvature rate), the acquisition path selection circuitry 310 determines whether the second candidate acquisition path is to be stored as a solution. For example, the acquisition path selection circuitry 310 calculates a path length of the second candidate acquisition path. In some examples, the acquisition path selection circuitry 310 determines whether the path length is less than a corresponding path length of a previous solution stored in the path generation database 312. In response to determining that the path length of the second candidate acquisition path is less than the corresponding path length of the previous solution, the acquisition path selection circuitry 310 causes storage of the second candidate acquisition path in the path generation database 312 as a current solution. Similarly, the acquisition path selection circuitry 310 causes storage of the second candidate acquisition path when there are no previous solutions stored in the path generation database 312. In some examples, the acquisition path selection circuitry 310 removes and/or overwrites the previous solution when causing storage of the second candidate acquisition path as a current solution. As such, in some examples, only one solution is stored in the path generation database 312 at a time. Alternatively, in response to determining that the path length of the second candidate acquisition path is the same as or greater than the path length of the previous solution, the second candidate acquisition is discarded.

In some examples, the path generation control circuitry 106 includes means for selecting. For example, the means for selecting may be implemented by the acquisition path selection circuitry 310. In some examples, the acquisition path selection circuitry 310 may be implemented by machine executable instructions such as that implemented by at least blocks 916, 918, 920, and 924 of FIG. 9 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the acquisition path selection circuitry 310 is implemented by other hardware logic circuitry, hardware implemented state machines, and/or any other combination of hardware, software, and/or firmware. For example, the acquisition path selection circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the acquisition path generation circuitry 308 iteratively selects different acquisition points along the target path until an iteration threshold has been reached. In some examples, the iteration threshold is a preset and/or predetermined value (e.g., 100 iterations, 1000 iterations, etc.) stored in the path generation control circuitry 106. In other examples, the iteration threshold can be selected and/or modified via user input from the user interface 114 of FIG. 1, and the iteration threshold can be provided to the path generation control circuitry 106 in the input data 316. In some examples, the acquisition path generation circuitry 308 generates candidate acquisition paths for each of the different acquisition points. In some examples, the acquisition path selection circuitry 310 causes storage of one of the candidate acquisition paths having a smallest path length from the candidate acquisition paths. In other examples, a portion (e.g., all) of the candidate acquisition paths that satisfy the threshold curvature and the threshold curvature rate are stored in the path generation database 312 as one or more example acquisition path solutions 318. In this example, the acquisition path selection circuitry 310 provides the one or more acquisition path solutions 318 to the vehicle control circuitry 104 of FIGS. 1 and/or 2 for use in generating the steering commands 210 of FIG. 2.

While an example manner of implementing the path generation control circuitry 106 of FIGS. 1 and/or 2 is illustrated in FIG. 3, one or more of the elements, processes, and/or devices illustrated in FIG. 3 may be combined, divided, re-arranged, omitted, eliminated, and/or implemented in any other way. Further, the example input interface circuitry 302, the example position modification circuitry 304, the example threshold calculation circuitry 306, the example acquisition path generation circuitry 308, the example acquisition path selection circuitry 310, the example path generation database 312 and/or, more generally, the example path generation control circuitry 106 of FIG. 3 may be implemented by hardware, software, firmware, and/or any combination of hardware, software, and/or firmware. Thus, for example, any of the example input interface circuitry 302, the example position modification circuitry 304, the example threshold calculation circuitry 306, the example acquisition path generation circuitry 308, the example acquisition path selection circuitry 310, the example path generation database 312, and/or, more generally, the example path generation control circuitry 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example input interface circuitry 302, the example position modification circuitry 304, the example threshold calculation circuitry 306, the example acquisition path generation circuitry 308, the example acquisition path selection circuitry 310, and/or the example path generation database 312 is/are hereby expressly defined to include a non-transitory computer readable storage device or storage disk such as a memory, a digital versatile disk (DVD), a compact disk (CD), a Blu-ray disk, etc., including the software and/or firmware. Further still, the example path generation control circuitry 106 of FIGS. 1 and/or 2 may include one or more elements, processes, and/or devices in addition to, or instead of, those illustrated in FIG. 3, and/or may include more than one of any or all of the illustrated elements, processes and devices.

Figure 4:
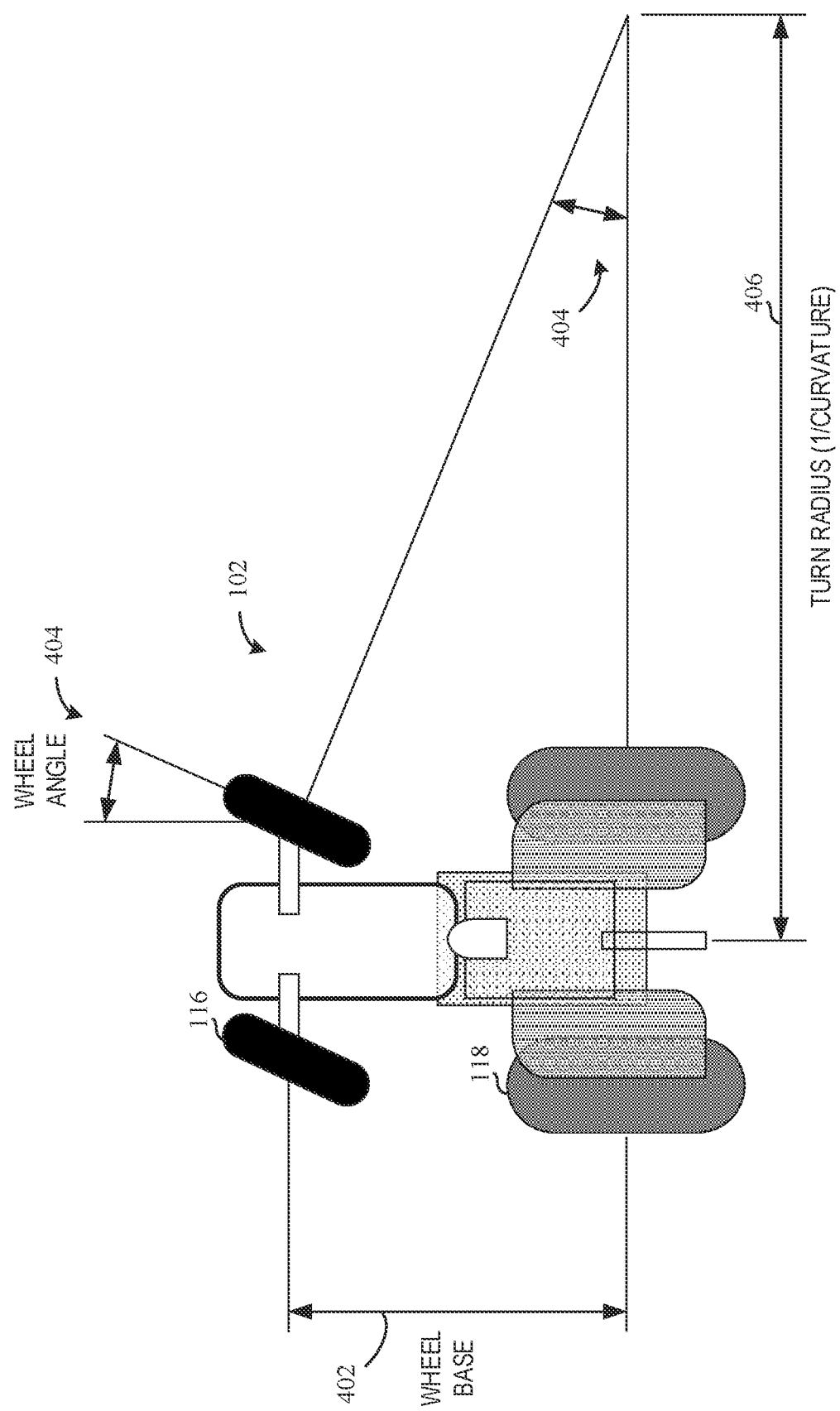
FIG. 4 is a plan view of the first example vehicle of FIG. 1.

FIG. 4 is a plan view of the example vehicle 102 of FIG. 1. In the illustrated example of FIG. 4, the vehicle 102 includes an example wheelbase 402, an example wheel angle 404, and an example turn radius 406 corresponding to a reciprocal of the curvature of the vehicle 102. The vehicle control circuitry 104 of FIGS. 1 and/or 2 provides the wheelbase 402, the wheel angle 404, and a maximum wheel angle rate to the path generation control circuitry 106 in the input data 316 of FIG. 3. In this example, the wheel angle 404 corresponds to a maximum wheel angle that can be achieved by the vehicle 102 based on a current speed of the vehicle 102, and the maximum wheel angle rate corresponds to a rate at which the wheel angle 404 can change per unit of time (e.g., per second). In this example, the wheelbase 402 corresponds to a distance between the front wheel 116 and the rear wheel 118 of the vehicle 102. In some examples, based on Equation 1 below and assuming a simple bicycle model, the threshold calculation circuitry 306 of the path generation control circuitry 106 of FIG. 3 calculates the turn radius 406 and, thus, the threshold curvature by calculating a tangent of the wheel angle 404 and dividing the result by the wheelbase 402. Furthermore, based on Equation 2 below, the threshold calculation circuitry 306 calculates the threshold curvature rate by dividing the maximum wheel angle rate by the wheelbase 402 and the current speed of the vehicle 102. In examples disclosed herein, the acquisition path generation circuitry 308 generates candidate acquisition paths based on the threshold curvature and the threshold curvature rate calculated by the threshold calculation circuitry 306.

$$\text{Threshold Curvature} = \frac{\tan(\text{Wheel Angle})}{\text{Wheelbase}} \quad \text{Equation 1}$$

$$\text{Threshold Curvature Rate} = \frac{\text{Wheel Angle Rate}}{\text{Wheelbase} \times \text{Current Speed}} \quad \text{Equation 2}$$

Figure 5:
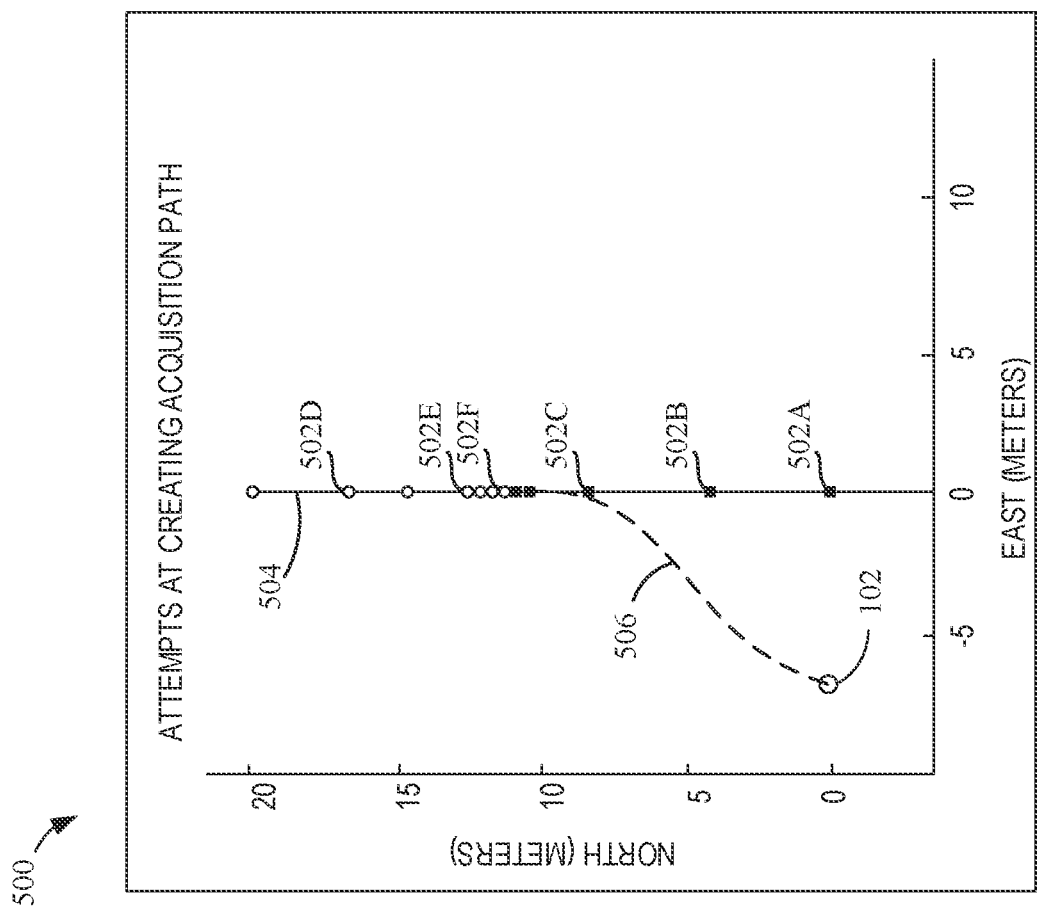
FIG. 5 illustrates example acquisition points along an example target path.

FIG. 5 is an example plot 500 illustrating example acquisition points 502 along an example target path 504. In the illustrated example of FIG. 5, the acquisition path generation circuitry 308 of FIG. 3 selects the acquisition points 502 and generates acquisition paths corresponding the acquisition points 502. In some examples, the acquisition path selection circuitry 310 of FIG. 3 calculates path lengths of the generated acquisition paths, and determines whether to cause storage of the acquisition paths based on the path lengths.

In the illustrated example of FIG. 5, the acquisition path generation circuitry 308 obtains the target path 504, the current position of the vehicle 102, the current heading of the vehicle 102, the current speed of the vehicle 102, and the current wheel angle from the input data 316 of FIG. 3. In this example, the target path 504 is a straight line. In other examples, the target path 504 can be any other shape and/or length instead. In this example, the acquisition path generation circuitry 308 selects a first example acquisition point 502A along the target path 504, where the first acquisition point 502A corresponds to a point on the target path 504 closest to the vehicle 102.

In some examples, the acquisition path generation circuitry 308 generates and/or attempts to generate a first candidate acquisition path between the current position of the vehicle 102 and the first acquisition point 502A that satisfies the threshold curvature and the threshold curvature rate determined by the threshold calculation circuitry 306 of FIG. 3. In some examples, the acquisition path generation circuitry 308 generates the first candidate acquisition path using two curves. For example, the acquisition path generation circuitry 308 generates an objective function based on reducing a path length of the first candidate acquisition path, and the acquisition path generation circuitry 308 provides the current position and the first acquisition point 502A as constraints for a start position and an end position, respectively, of the first candidate acquisition path. Furthermore, the acquisition path generation circuitry 308 provides the threshold curvature and the threshold curvature rate as constraints for the curvature and the curvature rate of the two curves of the first candidate acquisition path. The acquisition path generation circuitry 308 reduces (e.g., minimizes) the objective function based on the constraints to generate a list of points that define the first candidate acquisition path.

In this example, the acquisition path generation circuitry 308 is unable to generate the first candidate acquisition path that satisfies each of the constraints. When the acquisition path generation circuitry 308 is unsuccessful in generating the first candidate acquisition path corresponding to the first acquisition point 502A, the acquisition path generation circuitry 308 selects a second example acquisition point 502B on the target path 504, where the second acquisition point 502B is further from the vehicle 102 than the first acquisition point 502A. In such examples, the acquisition path generation circuitry 308 provides the second acquisition point 502B as a constraint for an the end position of a second candidate acquisition path, and the acquisition path generation circuitry 308 generates and/or attempts to generate the second candidate acquisition path based on the objective function and the constraints. Additionally, in response to the acquisition path generation circuitry 308 being unable to generate the second acquisition path that satisfies the constraints, the acquisition path generation circuitry 308 selects a third example acquisition point 502C on the target path 504 and generates and/or attempts to generate a third candidate acquisition path based on the third acquisition point 502C.

In the illustrated example of FIG. 5, the first, second, and third candidate acquisition paths corresponding to the first, second, and third acquisition points 502A, 502B, 502C are unsuccessful (e.g., are unable to satisfy the constraints of the objective function). Conversely, the acquisition path generation circuitry 308 successfully generates the fourth, fifth, and sixth candidate acquisition paths corresponding to the fourth, fifth, and sixth acquisition points 502D, 502E, 502F, respectively, that satisfy the constraints of the objective function.

In some examples, the acquisition path selection circuitry 310 calculates path lengths for successful ones of the candidate acquisition paths (e.g., the fourth, fifth, and sixth candidate acquisition paths). In some such examples, the acquisition path selection circuitry 310 selects one or more of the acquisition path solutions 318 of FIG. 3 based on the calculated path lengths. For example, in response to the acquisition path generation circuitry 308 generating the fourth candidate acquisition path and determining that the fourth candidate acquisition path satisfies the constraints, the acquisition path selection circuitry 310 calculates a fourth path length of the fourth candidate acquisition path. Furthermore, in response to the acquisition path generation circuitry 308 generating the fifth candidate acquisition path and determining that the fifth candidate acquisition path satisfies the constraints, the acquisition path selection circuitry 310 calculates a fifth path length of the fifth candidate acquisition path. In some examples, the acquisition path selection circuitry 310 selects the candidate acquisition path corresponding to a lesser one of the path lengths as the acquisition path solution 318. For example, the acquisition path selection circuitry 310 compares the fifth path length to the fourth path length. In response to determining that the fifth path length is less than the fourth path length, the acquisition path selection circuitry 310 selects the fifth candidate acquisition path as the acquisition path solution 318.

In the illustrated example of FIG. 5, the acquisition path generation circuitry 308 iteratively selects new acquisitions points until an iterations threshold is reached, and generates and/or attempts to generate candidate acquisition paths corresponding to the selected acquisition points. In some examples, the acquisition path selection circuitry 310 selects the acquisition path solution 318 corresponding to one of the candidate acquisition paths having the shortest path length. In the illustrated example of FIG. 5, the acquisition path selection circuitry 310 selects an example solution 508 corresponding to the sixth candidate acquisition path, and provides the solution 508 to the vehicle control circuitry 104 of FIGS. 1 and/or 2 for use in generating the steering commands 210 of FIG. 2.

Figure 6:
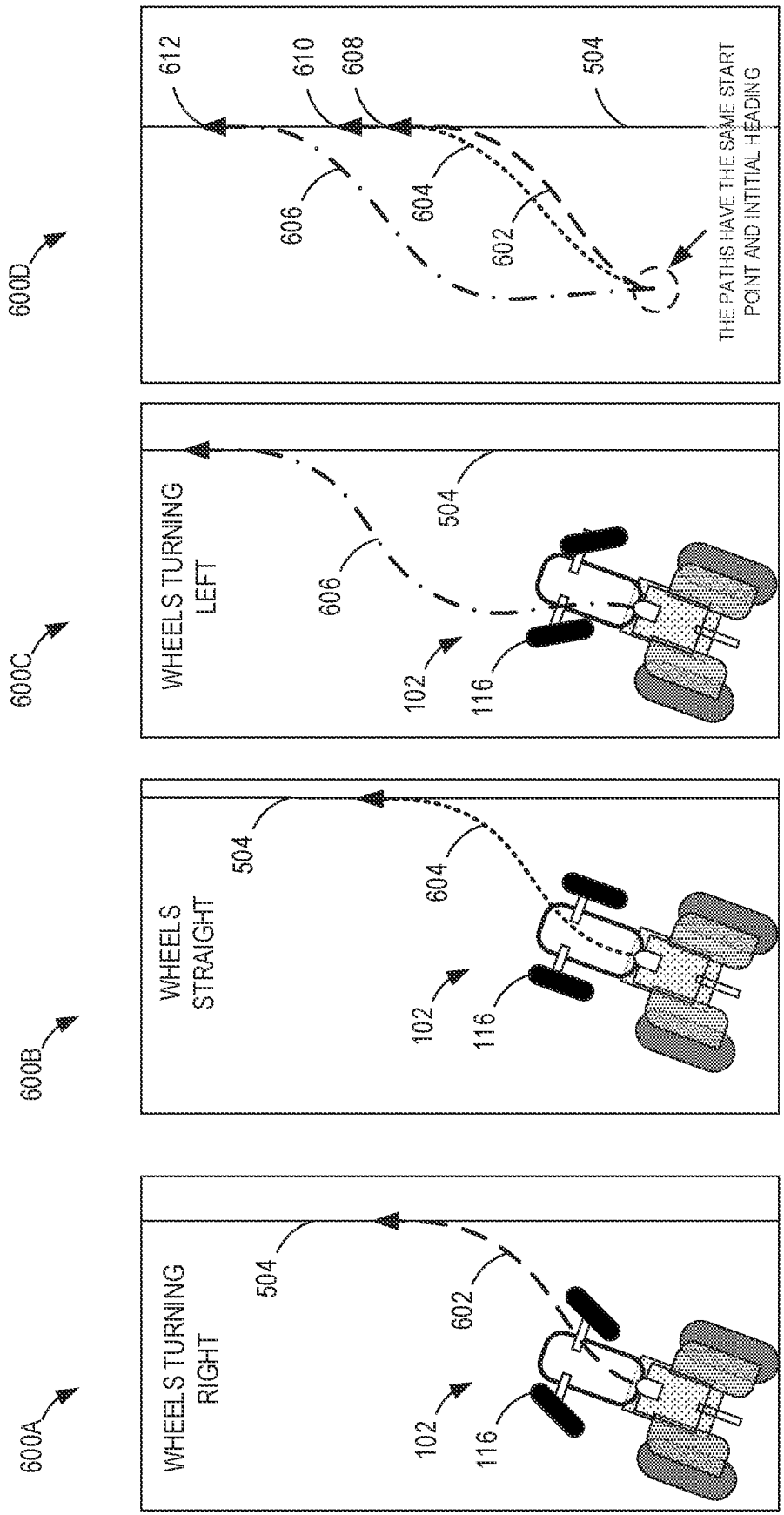
FIG. 6A illustrates a first example acquisition path for the first example vehicle of FIG. 4, wherein the wheels of the first example vehicle are turning to the right.
FIG. 6B illustrates a second example acquisition path for the first example vehicle of FIG. 4, wherein the wheels of the first example vehicle are straight.
FIG. 6C illustrates a third example acquisition path for the first example vehicle of FIG. 4, wherein the wheels of the first example vehicle are turning to the left.
FIG. 6D illustrates the example first, second, and third acquisition paths of FIGS. 6A, 6B, and 6C, respectively.

FIGS. 6A, 6B, and 6C illustrate example plots 600A, 600B, 600C including a first example acquisition path 602, a second example acquisition path 604, and a third example acquisition path 606, respectively, generated for the example vehicle 102 of FIG. 4. In the illustrated examples of 6A, 6B, and 6C, an initial position and an initial heading of the vehicle 102 is the same, but an initial wheel angle of the front wheel 116 is different. For example, in the illustrated example of FIG. 6A, the front wheel 116 is turning to the right at a first wheel angle, and the acquisition path generation circuitry 308 generates the first acquisition path 602 based on the first wheel angle. In the illustrated example of FIG. 6B, the front wheel 116 is substantially straight at a second wheel angle, and the acquisition path generation circuitry 308 generates the second acquisition path 604 based on the second wheel angle. In the illustrated example of FIG. 6C, the front wheel 116 is turning to the left at a third wheel angle, and the acquisition path generation circuitry 308 generates the third acquisition path 606 based on the third wheel angle.

FIG. 6D illustrates each of the first, second, and third acquisition paths 602, 604, 606 having the same initial position and initial heading. In the illustrated example of FIG. 6D, the first acquisition path 602 intersects the target path 504 at a first example point 608, the second acquisition path 604 intersects the target path 504 at an example second point 610, and the third acquisition path 606 intersects the target path 504 at an example third point 612. In this example, the second point 610 is closer to the vehicle 102 compared to the third point 612, and the first point 608 is closer to the vehicle 102 compared to both the second and third points 610, 612. As such, in this example, the first acquisition path 602 has a shorter path length compared to the second and third acquisition paths 604, 606. In some examples, the first, second, and third acquisition paths 602, 604, 606 match a curvature of the target path 504 at the first, second, and third points 608, 610, 612, respectively, to enable smooth transition of the vehicle 102 to the target path 504.

Figure 7:
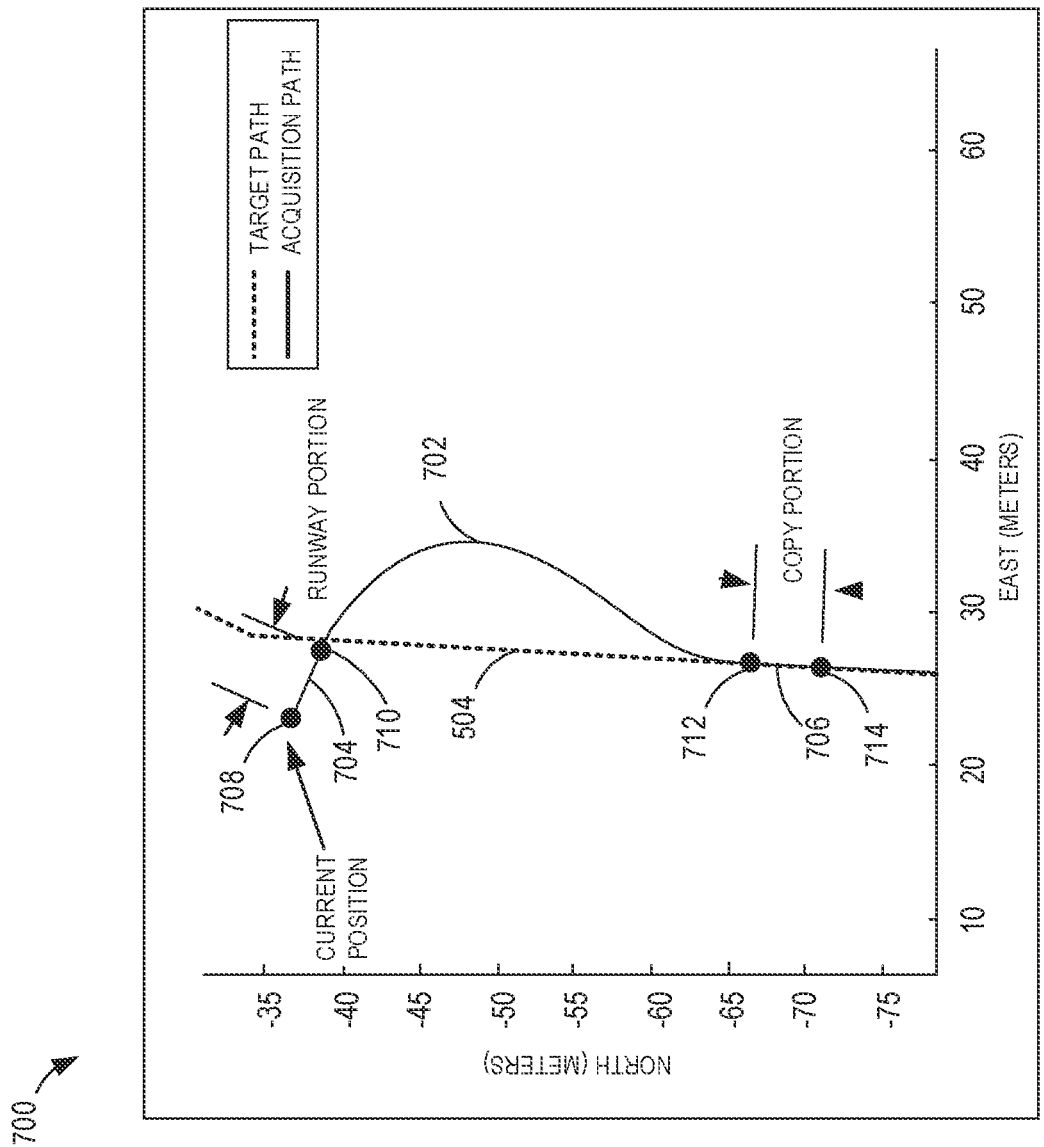
FIG. 7 illustrates an example acquisition path including an example runway portion and an example copy portion.

FIG. 7 is an example plot 700 illustrating an example acquisition path 702 having an example runway portion 704 and an example copy portion 706. In the illustrated example of FIG. 7, the vehicle 102 of FIG. 4 is positioned at an example current position (e.g., an actual current position) 708. In this example, the position modification circuitry 304 of FIG. 3 adjusts the current position 708 by adding the example runway portion 704 to the current position 708. For example, the position modification circuitry 304 determines a desired runway distance, a current curvature of the vehicle 102, and a current heading of the vehicle 102 based on the input data 316 of FIG. 3. In some examples, the desired runway distance is selected based on user input via the user interface 114 of FIG. 1, or is predetermined and/or otherwise preprogrammed in the path generation control circuitry 106 of FIG. 3. In this example, the position modification circuitry 304 projects the runway portion 704 forward from the current position 708 by the desired runway distance, such that the runway portion 704 matches a direction of the current heading and/or the current curvature of the vehicle 102. In this example, the position modification circuitry 304 determines an example projected current position 710 based on the runway portion 704, and the acquisition path generation circuitry 308 of FIG. 3 generates the acquisition path 702 based on the projected current position 710, instead of the actual current position 708, of the vehicle 102. In some examples, the runway portion 704 enables the vehicle 102 to track the current curvature for a period of time before tracking the acquisition path 702, thus enabling smooth transition of the vehicle 102 to the acquisition path 702 (e.g., without sudden and/or significant changes in curvature).

In the illustrated example of FIG. 7, the acquisition path 702 intersects the target path 504 at a first example end point 712. In this example, the acquisition path generation circuitry 308 copies a portion of the target path 504. In some examples, a copy distance of the copy portion 706 is selected based on the user input via the user interface 114, or is predetermined and/or otherwise preprogrammed in the path generation control circuitry 106. In this example, the acquisition path generation circuitry 308 adds the copy portion 706 to the acquisition path 702 at the first end point 712, such that the acquisition path 702 terminates at a second example end point 714 instead of the first end point 712. In some examples, the acquisition path generation circuitry 308 adds the copy portion 706 to the acquisition path 702 to ensure that the acquisition path 702 matches the target path 504 at the first end point 712.

Figure 8:
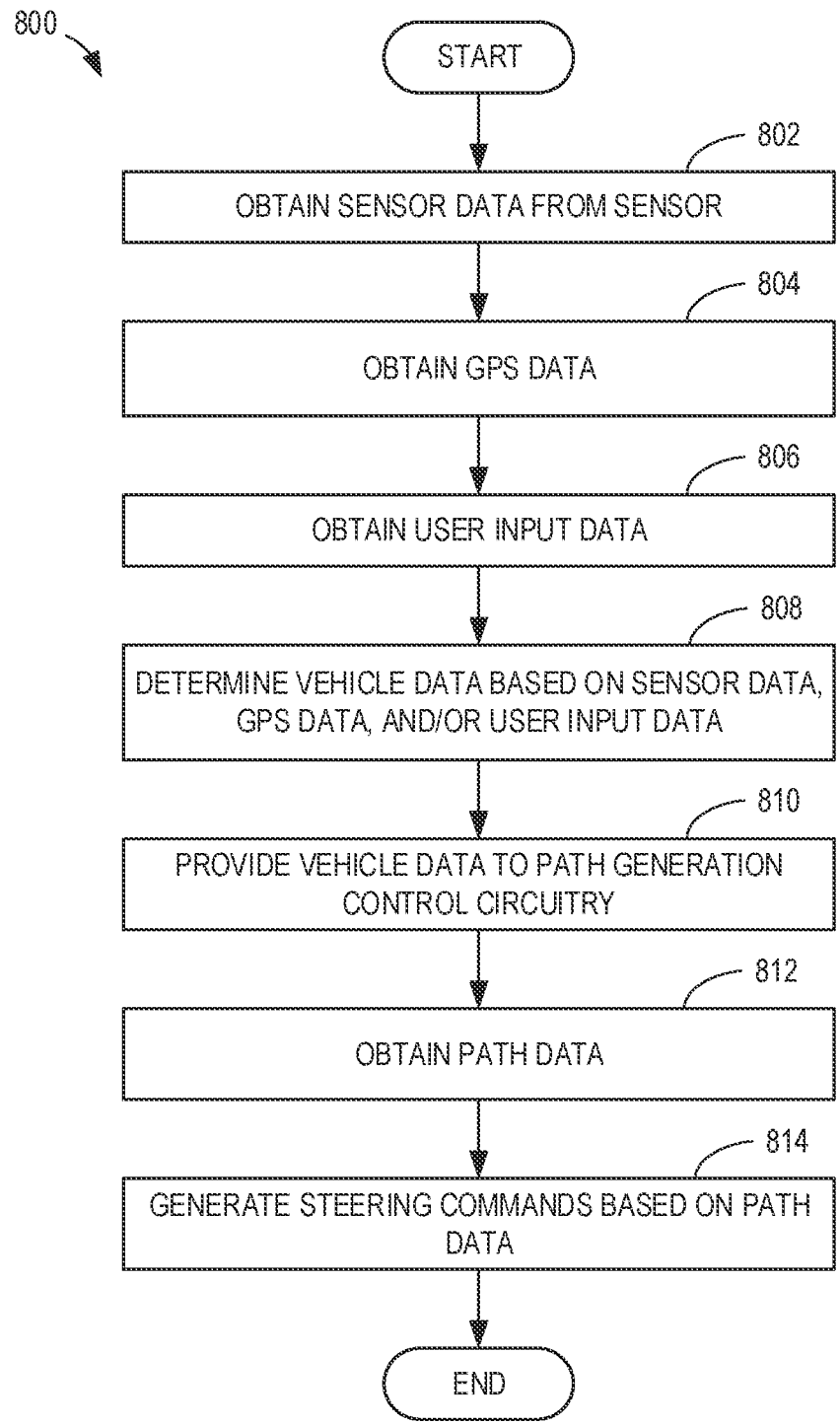
FIG. 8 is a flowchart representative of machine readable instructions that may be executed to implement the example vehicle control circuitry of FIG. 2.

A flowchart representative of example hardware logic circuitry, machine readable instructions, hardware implemented state machines, and/or any combination thereof for implementing the vehicle control circuitry 104 of FIG. 2 is shown in FIG. 8. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 12 and/or 13. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 8, many other methods of implementing the example vehicle control circuitry 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions and/or example operations 800 that may be executed and/or instantiated by the vehicle control circuitry 104 of FIGS. 1 and/or 2 to control the vehicle 102 of FIG. 1. The machine readable instructions and/or operations 800 of FIG. 8 begin at block 802, at which the vehicle control circuitry 104 obtains sensor data from the sensor 110 of FIG. 1. For example, the example vehicle data interface circuitry 202 of FIG. 2 is communicatively coupled to the sensor 110 to receive and/or otherwise obtain the sensor data therefrom. In some examples, the sensor data is indicative of a current wheel angle of the front and/or rear wheels 116, 118 of FIG. 1, maximum wheel angles in a leftward and a rightward direction, and/or a wheel angle rate of the vehicle 102.

At block 804, the example vehicle control circuitry 104 obtains GPS data from the GPS receiver 112 of FIG. 1. For example, the vehicle data interface circuitry 202 is communicatively coupled to the GPS receiver 112 to receive and/or otherwise obtain the GPS data therefrom. In some examples, the GPS data is indicative of a current position, a current heading, and/or a current speed of the vehicle 102.

At block 806, the example vehicle control circuitry 104 obtains user input data from the user interface 114 of FIG. 1. For example, the vehicle data interface circuitry 202 is communicatively coupled to the user interface 114 to receive and/or otherwise obtain the user input data therefrom. In some examples, the user input data includes a target path of the vehicle selected from one or more guidance paths stored in the vehicle data database 206 of FIG. 2, and/or includes a wheelbase of the vehicle 102.

At block 808, the example vehicle control circuitry 104 determines vehicle data based on the sensor data, the GPS data, and/or the user input data. For example, the vehicle data interface circuitry 202 determines the vehicle data including the current wheel angle, the maximum wheel angles in the leftward and the rightward directions, the wheel angle rate, the current position, the current heading, the current speed, the target path, and/or the wheelbase of the vehicle 102.

At block 810, the example vehicle control circuitry 104 provides the vehicle data to the path generation control circuitry 106 of FIGS. 1, 2, and/or 3. For example, the example network interface circuitry 208 of FIG. 2 is communicatively coupled to the path generation control circuitry 106 to provide the vehicle data thereto for use in determining an acquisition path for the vehicle 102.

At block 812, the example vehicle control circuitry 104 obtains path data from the path generation control circuitry 106. For example, the network interface circuitry 208 obtains the path data generated by the path generation control circuitry 106 based on the vehicle data. In some examples, the path data includes an acquisition path along which the vehicle 102 can travel to reach the target path.

At block 814, the example vehicle control circuitry 104 generates the steering commands 210 of FIG. 2 based on the path data. For example, the example guidance control circuitry 204 of FIG. 2 generates the steering commands 210 based on the target path and the acquisition path from the path data. In some examples, the steering commands 210 cause steering of the front and rear wheels 116, 118 by controlling an angle at which the wheels 116, 118 turn and/or a rotation speed of the wheels 116, 118.

Figure 9:
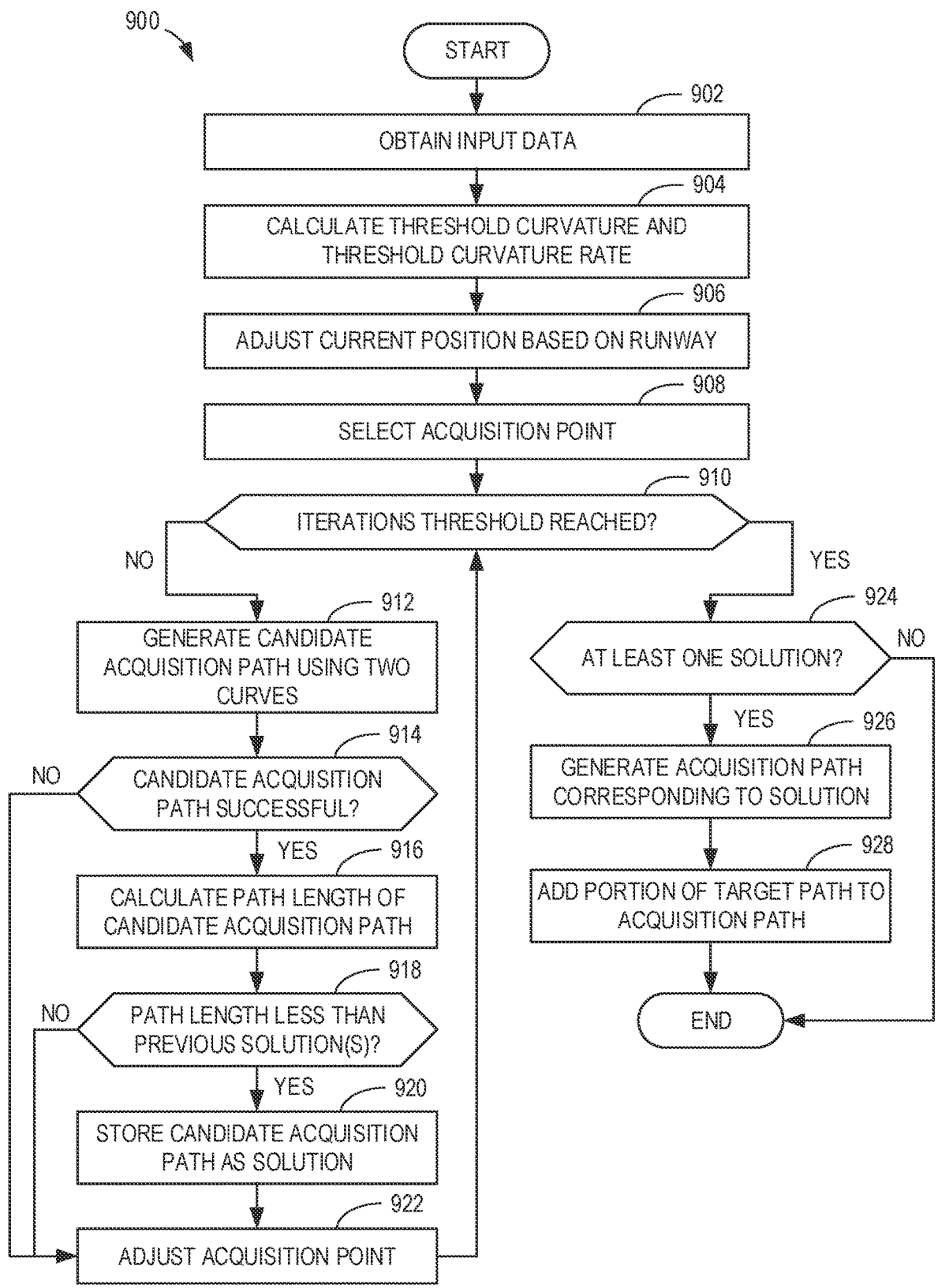
FIG. 9 is a flowchart representative of machine readable instructions that may be executed to implement the example path generation control circuitry of FIG. 3.

A flowchart representative of example hardware logic circuitry, machine readable instructions, hardware implemented state machines, and/or any combination thereof for implementing the path generation control circuitry 106 of FIG. 3 is shown in FIG. 9. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 9, many other methods of implementing the example path generation control circuitry 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

FIG. 9 is a flowchart representative of example machine readable instructions and/or example operations 900 that may be executed and/or instantiated by the path generation control circuitry 106 of FIGS. 1, 2, and/or 3 to generate acquisition paths for the vehicle 102 of FIG. 1. The machine readable instructions and/or operations 900 of FIG. 9 begin at block 902, at which the example path generation control circuitry 106 obtains the input data 316 of FIG. 3 from the example vehicle control circuitry 104 of FIGS. 1 and/or 2. For example, the example input interface circuitry 302 of FIG. 3 is communicatively coupled to the example network interface circuitry 208 of FIG. 2 to receive and/or otherwise obtain the input data 316 therefrom, where the input data includes a current wheel angle, a maximum wheel angles in leftward and rightward directions, a wheel angle rate, a current position, a current heading, a current speed, a target path, and/or a wheelbase of the vehicle 102.

At block 904, the example path generation control circuitry 106 calculates a threshold curvature and a threshold curvature rate based on the input data 316. For example, the example threshold calculation circuitry 306 of FIG. 3 calculates the threshold curvature using a simple bicycle model based on the wheelbase, the current speed, and the wheel angle rate from the input data 316, and calculates the threshold curvature rate by linearizing the simple bicycle model at a wheel angle of zero degrees. In some examples, the threshold curvature corresponds to a largest curvature of a path along which the vehicle 102 can travel given the current speed of the vehicle 102, and the threshold curvature rate corresponds to a rate at which the vehicle 102 can change curvature for the current wheel angle.

At block 906, the example path generation control circuitry 106 adjusts the current position of the vehicle 102 based on a runway. For example, the example position modification circuitry 304 of FIG. 3 adjusts the current position by determining a current curvature of the vehicle 102 based on in the input data 316, and projecting the runway from the current position based on the current curvature and a selected runway distance. In some examples, the position modification circuitry 304 updates the current position of the vehicle 102 for use in generating an acquisition path therefrom.

At block 908, the example path generation control circuitry 106 selects an acquisition point on the target path. For example, the example acquisition path generation circuitry 308 of FIG. 3 selects the acquisition point on the target path that is closest to the vehicle 102.

At block 910, the example path generation control circuitry 106 determines whether an iterations threshold has been reached. For example, in response to the acquisition path generation circuitry 308 determining that the iterations threshold has been reached (e.g., block 910 returns a result of YES), control proceeds to block 924. Alternatively, in response to the acquisition path generation circuitry 308 determining that the iterations threshold has not been reached (e.g., block 910 returns a result of NO), control proceeds to block 912.

At block 912, the example path generation control circuitry 106 generates a candidate acquisition path using two curves. For example, the acquisition path generation circuitry 308 generates and/or attempts to generate the candidate acquisition path from the current position of the vehicle 102 to the selected acquisition point.

At block 914, the example path generation control circuitry 106 determines whether the candidate acquisition path is successful. In some examples, the acquisition path generation circuitry 308 determines whether the candidate acquisition path is successful based on whether the candidate acquisition path satisfies the threshold curvature and the threshold curvature rate. In response to the acquisition path generation circuitry 308 determining that the candidate acquisition path is successful (e.g., block 914 returns a result of YES), control proceeds to block 916. Alternatively, in response to the acquisition path generation circuitry 308 determining that the candidate acquisition path is not successful (e.g., block 914 returns a result of NO), control proceeds to block 922.

At block 916, the example path generation control circuitry 106 calculates a path length of the candidate acquisition path. For example, the example acquisition path selection circuitry 310 of FIG. 3 calculates the path length of the candidate acquisition path.

At block 918, the example path generation control circuitry 106 determines whether the path length is less than previous path lengths of one or more previous solutions. For example, in response to the acquisition path selection circuitry 310 determining that the path length is less than the previous path lengths and/or in response to determining that there are no previous solutions (e.g., block 918 returns a result of YES), control proceeds to block 920. Alternatively, in response to the acquisition path selection circuitry 310 determining that the path length is not less than the previous path lengths (e.g., block 918 returns a result of NO), control proceeds to block 922.

At block 920, the example path generation control circuitry 106 stores the candidate acquisition path as a solution. For example, the acquisition path selection circuitry 310 causes storage of the candidate acquisition path as a solution in the example path generation database 312 of FIG. 3. In some examples, the acquisition path selection circuitry 310 overwrites the one or more previous solutions with the candidate acquisition path, such that one solution is stored in the path generation database 312. In other examples, the acquisition path selection circuitry 310 causes storage of the candidate acquisition path with the one or more previous solutions and/or with a portion of the one or more previous solutions.

At block 922, the example path generation control circuitry 106 adjusts the acquisition point. For example, the acquisition path generation circuitry 308 selects a new acquisition point on the target path, where the new acquisition point is different from previous acquisition points selected by the acquisition path generation circuitry 308.

At block 924, the example path generation control circuitry 106 determines whether at least one solution has been generated. For example, the acquisition path selection circuitry 310 determines whether the at least one solution has been generated based on whether at least one candidate acquisition path is stored in the path generation database 312. In response to the acquisition path selection circuitry 310 determining that at least one solution has been generated (e.g., block 924 returns a result of YES), control proceeds to block 926. Alternatively, in response to the acquisition path selection circuitry 310 determining that no solutions have been generated (e.g., block 924 returns a result of NO), the process ends.

At block 926, the example path generation control circuitry 106 generates an acquisition path corresponding to the at least one solution. For example, the acquisition path generation circuitry 308 generates a list of points identifying locations of the acquisition path corresponding to the at least one solution stored in the path generation database 312.

At block 928, the example path generation control circuitry 106 adds a portion of the target path to the acquisition path. For example, the acquisition path generation circuitry 308 copies a portion of the target path and adds the copied portion to an end of the acquisition path at the acquisition point.

Figure 10:
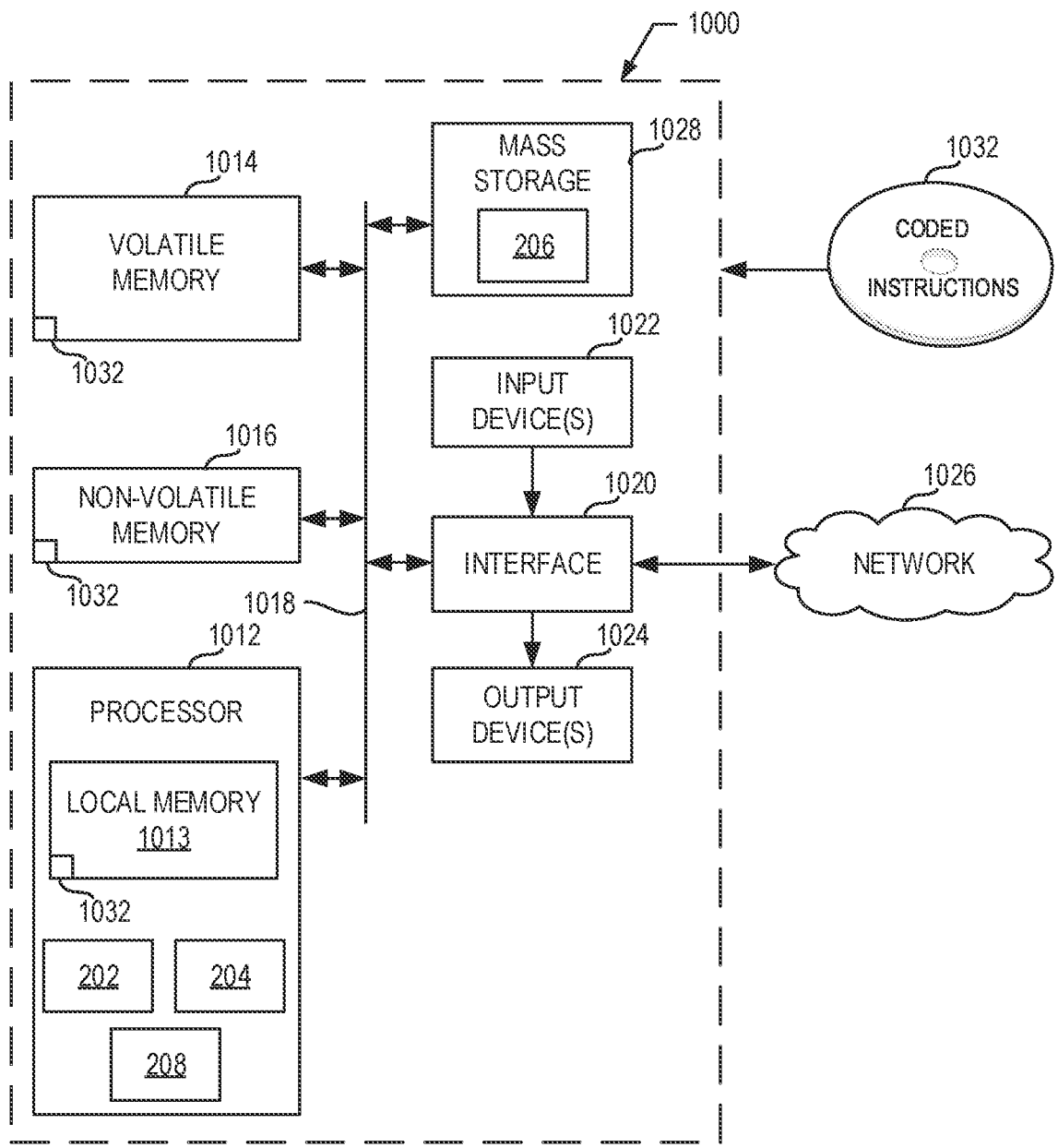
FIG. 10 is a block diagram of an example processing platform structured to execute the instructions of FIG. 8 to implement the example vehicle control circuitry of FIG. 2.

FIG. 10 is a block diagram of an example processor platform 1000 structured to execute and/or instantiate the machine readable instructions and/or operations of FIG. 8 to implement the vehicle control circuitry 104 of FIG. 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the vehicle data interface circuitry 202, the guidance control circuitry 204, and the network interface circuitry 208.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAIVIBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface circuitry to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine readable instructions of FIG. 8, may be stored in the mass storage device 1028, in the volatile memory 1014, in the non-volatile memory 1016, and/or on a removable non-transitory computer readable storage medium such as a CD or DVD.

Figure 11:
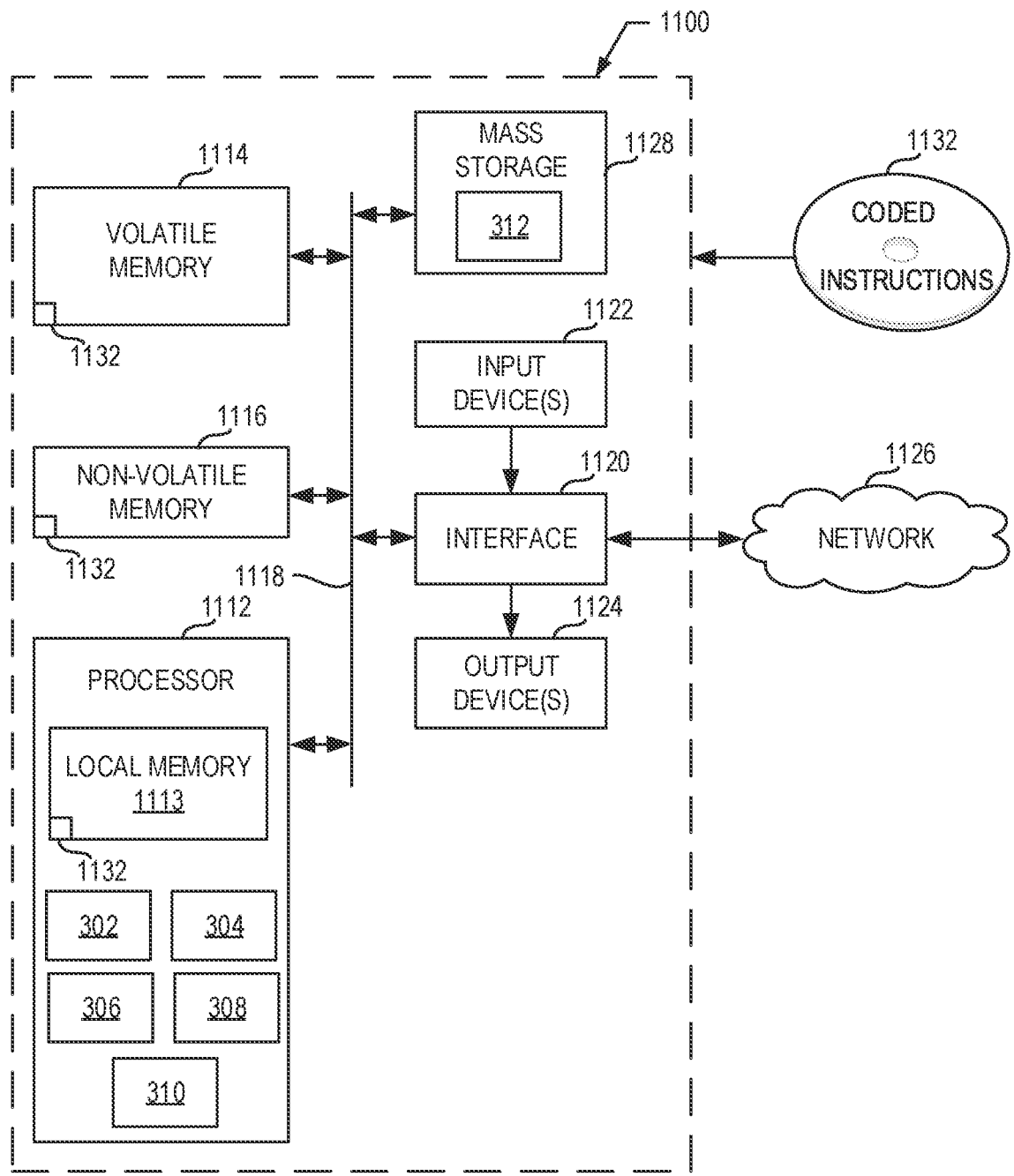
FIG. 11 is a block diagram of an example processing platform structured to execute the instructions of FIG. 9 to implement the example path generation control circuitry of FIG. 3.

FIG. 11 is a block diagram of an example processor platform 1100 structured to execute and/or instantiate the machine readable instructions and/or operations of FIG. 9 to implement the path generation control circuitry 106 of FIG. 3. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the input interface circuitry 302, the position modification circuitry 304, the threshold calculation circuitry 306, the acquisition path generation circuitry 308, and the acquisition path selection circuitry 310.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAIVIBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface circuitry to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine readable instructions of FIG. 9, may be stored in the mass storage device 1128, in the volatile memory 1114, in the non-volatile memory 1116, and/or on a removable non-transitory computer readable storage medium such as a CD or DVD.

Figure 12:
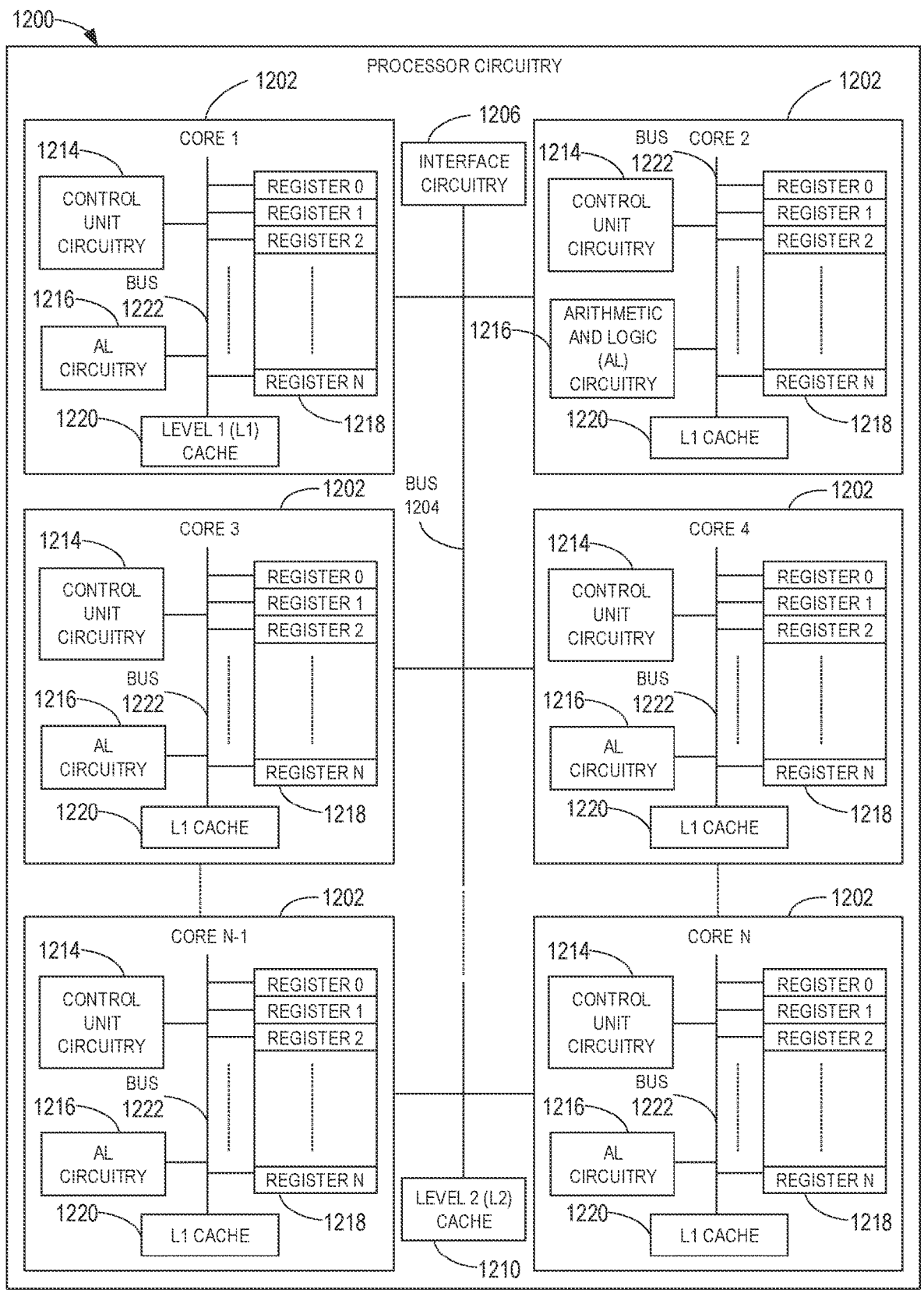
FIG. 12 is a block diagram of an example implementation of the processor circuitry of FIGS. 10 and/or 11.

FIG. 12 is a block diagram of an example implementation of the processor circuitry 1012 of FIG. 10 and/or the processor circuitry 1112 of FIG. 11. In this example, the processor circuitry 1012 of FIG. 10 and/or the processor circuitry 1112 of FIG. 11 is/are implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIGS. 8 and/or 9.

The cores 1202 may communicate by an example bus 1204. In some examples, the bus 1204 may implement a communication bus to effectuate communication associated with one(s) of the cores 1202. For example, the bus 1204 may implement at least one of an Inter-Integrated Circuit (I2C) bus, a Serial Peripheral Interface (SPI) bus, a PCI bus, or a PCIe bus. Additionally or alternatively, the bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1014, 1016 of FIG. 10 and/or the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and an example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The bus 1222 may implement at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general puspose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
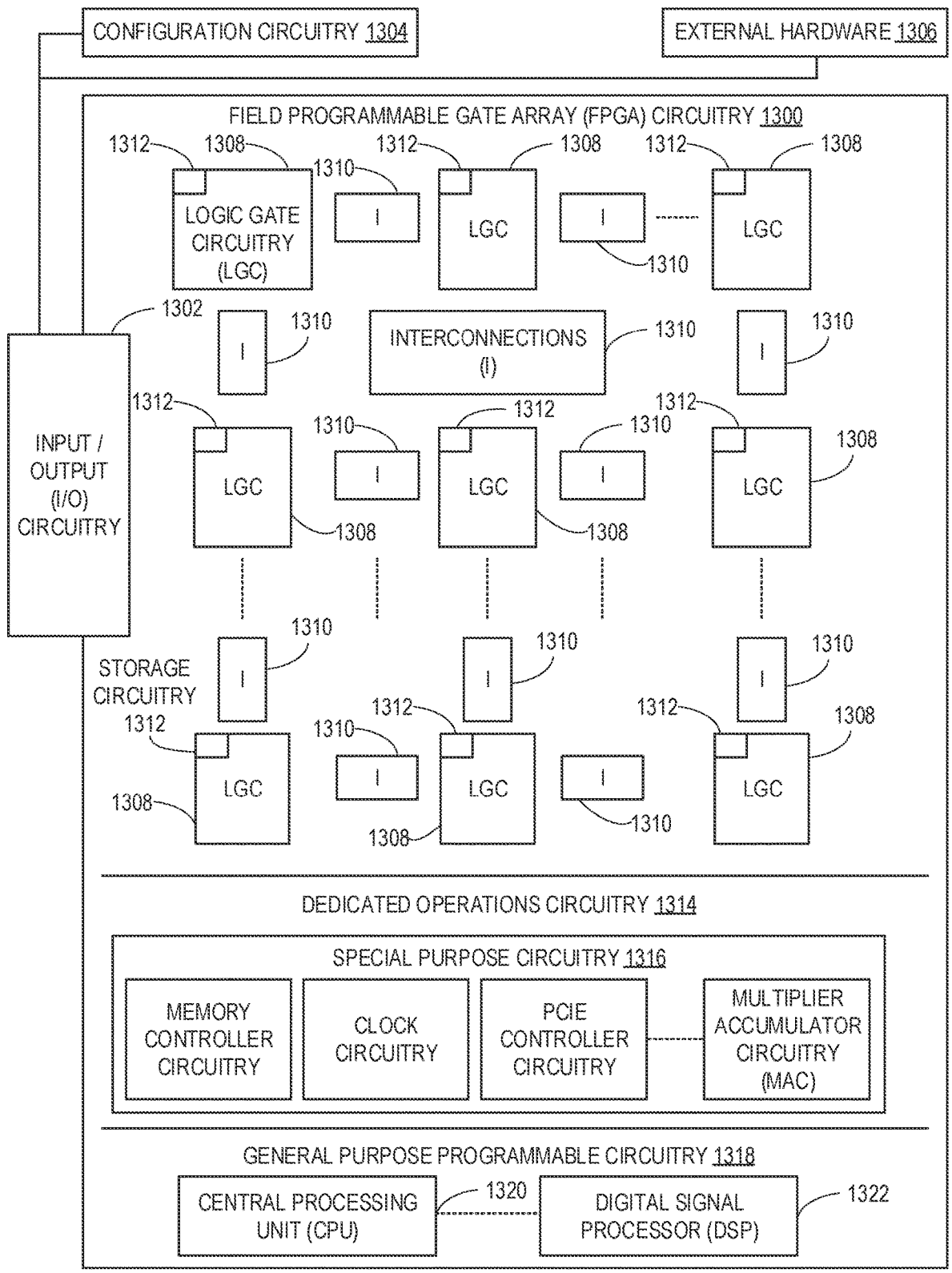
FIG. 13 is a block diagram of another example implementation of the processor circuitry of FIGS. 10 and/or 11.

FIG. 13 is a block diagram of another example implementation of the processor circuitry 1012 of FIG. 10 and/or the processor circuitry 1112 of FIG. 11. In this example, the processor circuitry 412 is implemented by FPGA circuitry 1300. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowcharts of FIGS. 8 and/or 9 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIGS. 8 and/or 9. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 8 and/or 9. As such, the FPGA circuitry 1300 may be structured to effectively instantiate some or all of the machine readable instructions of the flowcharts of FIGS. 8 and/or 9 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 8 and/or 9 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIGS. 8 and/or 9 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1012 of FIG. 10 and/or the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1012 of FIG. 10 and/or the processor circuitry 1112 of FIG. 11may additionally be implemented by combining the example microprocessor 1200 of FIG. 12 and the example FPGA circuitry 1300 of FIG. 13. In some such hybrid examples, a first portion of the machine readable instructions represented by the flowcharts of FIGS. 8 and/or 9 may be executed by one or more of the cores 1202 of FIG. 12 and a second portion of the machine readable instructions represented by the flowcharts of FIGS. 8 and/or 9 may be executed by the FPGA circuitry 1300 of FIG. 13.

In some examples, the processor circuitry 1012 of FIG. 10 and/or the processor circuitry 1112 of FIG. 11 may be in one or more packages. For example, the microprocessor 1200 of FIG. 12 and/or the FPGA circuitry 1300 of FIG. 13 may be in one or more packages. In some examples, an XPU may be implemented by the processor circuitry 1012 of FIG. 10 and/or the processor circuitry 1112 of FIG. 11, which may be in one or more packages. For example, the XPU may include a CPU in one package, a DSP in another package, a GPU in yet another package, and an FPGA in still yet another package.

Figure 14:
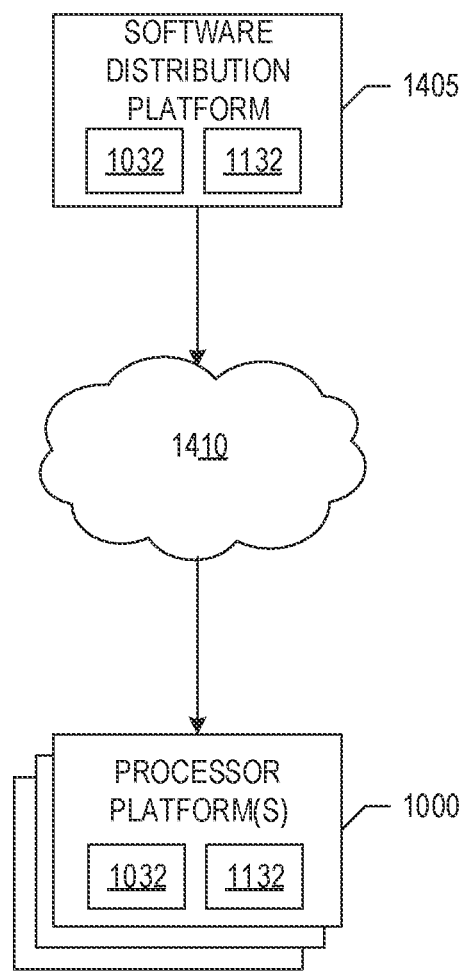
FIG. 14 is a block diagram of an example software distribution platform (e.g., one or more servers) to distribute software (e.g., software corresponding to the example machine readable instructions of FIGS. 8 and/or 9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1032 of FIG. 10 and/or the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform_05 may be a developer, a seller, and/or a licensor of software such as the example machine readable instructions 1032 of FIG. 10 and/or the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1432, which may correspond to the example machine readable instructions 1032 of FIG. 10 and/or the example machine readable instructions 1132 of FIG. 11, as described above. The one or more servers of the example software distribution platform 1405 are in communication with a network 1410, which may correspond to any one or more of the Internet and/or any of the example networks 1026, 1126 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the example machine readable instructions 1032 of FIG. 10 and/or the example machine readable instructions 1132 of FIG. 11 from the software distribution platform 1405. For example, the software, which may correspond to the example machine readable instructions 1032 of FIG. 10 and/or the example machine readable instructions 1132 of FIG. 11, may be downloaded to the example processor platform 1000 and/or the example processor platform 1100, which is/are to execute the example machine readable instructions 1032 of FIG. 10 and/or the example machine readable instructions 1132 of FIG. 11 to implement the example vehicle control circuitry 104 and/or the example path generation control circuitry 106. In some example, one or more servers of the software distribution platform 1405 periodically offer, transmit, and/or force updates to the software (e.g., the example machine readable instructions 1032 of FIG. 10 and/or the example machine readable instructions 1132 of FIG. 11) to ensure improvements, patches, updates, etc., are distributed and applied to the software at the end user devices.

From the foregoing, it will be appreciated that example systems, methods, apparatus, and articles of manufacture have been disclosed that generate acquisition paths based on two curves that satisfy a threshold curvature and a threshold curvature rate of a vehicle. As such, examples disclosed herein ensure that the generated acquisition paths can be tracked by the vehicle without sudden and/or rapid changes in curvature. Furthermore, examples disclosed herein add a runway portion and/or a copy portion to the acquisition paths to enable smooth transition of the vehicle from a current position to a target path of the vehicle. The disclosed systems, methods, apparatus, and articles of manufacture improve the efficiency of using a computing device by reducing resource consumption of the computing device when generating the acquisition paths. For example, the disclosed systems, methods, apparatus, and articles of manufacture calculate path lengths of the acquisition paths and cause storage of ones of the acquisition paths having path lengths less than previous solutions, thus reducing a number of the acquisition paths to be stored. The disclosed systems, methods, apparatus, and articles of manufacture are accordingly directed to one or more improvement(s) in the operation of a machine such as a computer or other electronic and/or mechanical device.

Example 1 includes an apparatus including input interface circuitry to obtain input data associated with a vehicle, threshold calculation circuitry to calculate, based on the input data, a threshold curvature and a threshold curvature rate of the vehicle, and acquisition path generation circuitry to select a point on a target path of the vehicle, generate an acquisition path from a current position of the vehicle to the point, the acquisition path including at least two curves, and cause storage of the acquisition path in response to the at least two curves satisfying the threshold curvature and the threshold curvature rate.

Example 2 includes the apparatus of Example 1, where the input data includes at least one of the current position of the vehicle, a current heading of the vehicle, a current speed of the vehicle, a wheel angle of the vehicle, a wheel angle rate of the vehicle, or a wheelbase of the vehicle.

Example 3 includes the apparatus of Example 1, where the input interface circuitry obtains the input data from at least one of a sensor associated with the vehicle or a global positioning system (GPS) of the vehicle.

Example 4 includes the apparatus of Example 1, where the point is a first point, the acquisition path is a first acquisition path, the acquisition path generation circuitry to select a second point on the target path, and generate a second acquisition path from the current position of the vehicle to the second point, the second acquisition path satisfying the threshold curvature and the threshold curvature rate.

Example 5 includes the apparatus of Example 4, further including acquisition path selection circuitry to calculate a first path length of the first acquisition path and a second path length of the second acquisition path, select a lesser one of the first path length or the second path length, and cause storage of the first acquisition path or the second acquisition path corresponding to the lesser one of the first path length or the second path length.

Example 6 includes the apparatus of Example 1, where the acquisition path generation circuitry is to copy a portion of the target path and add the copied portion to an end of the acquisition path.

Example 7 includes the apparatus of Example 1, further including position modification circuitry to adjust the current position of the vehicle by adding a runway to the current position, the runway based on a current curvature of the vehicle.

Example 8 includes a non-transitory computer readable medium including instructions that, when executed, cause at least one processor to at least obtain input data associated with a vehicle, calculate, based on the input data, a threshold curvature and a threshold curvature rate of the vehicle, select a point on a target path of the vehicle, generate an acquisition path from a current position of the vehicle to the point, the acquisition path including at least two curves, and cause storage of the acquisition path in response to the at least two curves satisfying the threshold curvature and the threshold curvature rate.

Example 9 includes the non-transitory computer readable medium of Example 8, where the input data includes at least one of the current position of the vehicle, a current heading of the vehicle, a current speed of the vehicle, a wheel angle of the vehicle, a wheel angle rate of the vehicle, or a wheelbase of the vehicle.

Example 10 includes the non-transitory computer readable medium of Example 8, where the instructions, when executed, cause the at least one processor to obtain the input data from at least one of a sensor associated with the vehicle or a global positioning system (GPS) of the vehicle.

Example 11 includes the non-transitory computer readable medium of Example 8, where the point is a first point, the acquisition path is a first acquisition path, the instructions, when executed, cause the at least one processor to select a second point on the target path, and generate a second acquisition path from the current position of the vehicle to the second point, the second acquisition path satisfying the threshold curvature and the threshold curvature rate.

Example 12 includes the non-transitory computer readable medium of Example 11, where the instructions, when executed, cause the at least one processor to calculate a first path length of the first acquisition path and a second path length of the second acquisition path, select a lesser one of the first path length or the second path length, and cause storage of the first acquisition path or the second acquisition path corresponding to the lesser one of the first path length or the second path length.

Example 13 includes the non-transitory computer readable medium of Example 8, where the instructions, when executed, cause the at least one processor to copy a portion of the target path and add the copied portion to an end of the acquisition path.

Example 14 includes the non-transitory computer readable medium of Example 8, where the instructions, when executed, cause the at least one processor to adjust the current position of the vehicle by adding a runway to the current position, the runway based on a current curvature of the vehicle.

Example 15 includes an apparatus including means for obtaining to obtain input data associated with a vehicle, means for calculating to calculate, based on the input data, a threshold curvature and a threshold curvature rate of the vehicle, and means for generating to select a point on a target path of the vehicle, generate an acquisition path from a current position of the vehicle to the point, the acquisition path including at least two curves, and cause storage of the acquisition path in response to the at least two curves satisfying the threshold curvature and the threshold curvature rate.

Example 16 includes the apparatus of Example 15, where the input data includes at least one of the current position of the vehicle, a current heading of the vehicle, a current speed of the vehicle, a wheel angle of the vehicle, a wheel angle rate of the vehicle, or a wheelbase of the vehicle.

Example 17 includes the apparatus of Example 15, where the means for obtaining obtains the input data from at least one of a sensor associated with the vehicle or a global positioning system (GPS) of the vehicle.

Example 18 includes the apparatus of Example 15, where the point is a first point, the acquisition path is a first acquisition path, the means for generating is to select a second point on the target path, and generate a second acquisition path from the current position of the vehicle to the second point, the second acquisition path satisfying the threshold curvature and the threshold curvature rate.

Example 19 includes the apparatus of Example 18, further including means for selecting to calculate a first path length of the first acquisition path and a second path length of the second acquisition path, select a lesser one of the first path length or the second path length, and cause storage of the first acquisition path or the second acquisition path corresponding to the lesser one of the first path length or the second path length.

Example 20 includes the apparatus of Example 15, where the means for generating is to copy a portion of the target path and add the copied portion to an end of the acquisition path.

Example 21 includes the apparatus of Example 15, further including means for adjusting to adjust the current position of the vehicle by adding a runway to the current position, the runway based on a current curvature of the vehicle.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus including:
input interface circuitry to obtain input data associated with a vehicle;
threshold calculation circuitry to calculate, based on the input data, a threshold curvature and a threshold curvature rate of the vehicle; and
acquisition path generation circuitry to:
select a first point and a second point on a target path of the vehicle;
generate a first acquisition path from a current position of the vehicle to the first point, the first acquisition path including at least two curves;
generate a second acquisition path from the current position of the vehicle to the second point, the second acquisition path including at least two curves;
determine whether the first acquisition path and the second acquisition path satisfy the threshold curvature and the threshold curvature rate;
in response to the first acquisition path and the second acquisition path satisfying the threshold curvature and the threshold curvature rate, calculate a first path length of the first acquisition path and a second path length of the second acquisition path;
compare the first path length and the second path length to determine which acquisition path is shorter;
cause storage of a shorter acquisition path; and
vehicle control circuitry to control steering of the vehicle as it follows the shorter acquisition path.

2. The apparatus of claim 1, wherein the input data includes at least one of the current position of the vehicle, a current heading of the vehicle, a current speed of the vehicle, a wheel angle of the vehicle, a wheel angle rate of the vehicle, or a wheelbase of the vehicle.

3. The apparatus of claim 1, wherein the input interface circuitry obtains the input data from at least one of a sensor associated with the vehicle or a global positioning system (GPS) of the vehicle.

4. The apparatus of claim 1, wherein the acquisition path generation circuitry is to copy a portion of the target path and add the copied portion to an end of the shorter acquisition path.

5. The apparatus of claim 1, further including position modification circuitry to adjust the current position of the vehicle by adding a runway to the current position, the runway based on a current curvature of the vehicle.

6. A non-transitory computer readable medium comprising instructions that, when executed, cause at least one processor to at least:
obtain input data associated with a vehicle;
calculate, based on the input data, a threshold curvature and a threshold curvature rate of the vehicle;
select a first point and a second point on a target path of the vehicle;
generate a first acquisition path from a current position of the vehicle to the first point, the first acquisition path including at least two curves;
generate a second acquisition path from the current position of the vehicle to the second point, the second acquisition path including at least two curves;
determine whether the first acquisition path and the second acquisition path satisfy the threshold curvature and the threshold curvature rate;
in response to the first acquisition path and the second acquisition path satisfying the threshold curvature and the threshold curvature rate, calculate a first path length of the first acquisition path and a second path length of the second acquisition path;
compare the first path length and the second path length to determine which acquisition path is shorter;
cause storage of a shorter acquisition path; and
control steering of the vehicle as it follows the shorter acquisition path.

7. The non-transitory computer readable medium of claim 6, wherein the input data includes at least one of the current position of the vehicle, a current heading of the vehicle, a current speed of the vehicle, a wheel angle of the vehicle, a wheel angle rate of the vehicle, or a wheelbase of the vehicle.

8. The non-transitory computer readable medium of claim 6, wherein the instructions, when executed, cause the at least one processor to obtain the input data from at least one of a sensor associated with the vehicle or a global positioning system (GPS) of the vehicle.

9. The non-transitory computer readable medium of claim 6, wherein the instructions, when executed, cause the at least one processor to copy a portion of the target path and add the copied portion to an end of the shorter acquisition path.

10. The non-transitory computer readable medium of claim 6, wherein the instructions, when executed, cause the at least one processor to adjust the current position of the vehicle by adding a runway to the current position, the runway based on a current curvature of the vehicle.

11. An apparatus including:
means for obtaining to obtain input data associated with a vehicle;
means for calculating to calculate, based on the input data, a threshold curvature and a threshold curvature rate of the vehicle; and
means for generating to:
select a first point and a second point on a target path of the vehicle;
generate a first acquisition path from a current position of the vehicle to the first point, the first acquisition path including at least two curves;
generate a second acquisition path from the current position of the vehicle to the second point, the second acquisition path including at least two curves;
determine whether the first acquisition path and the second acquisition path satisfy the threshold curvature and the threshold curvature rate;
in response to the first acquisition path and the second acquisition path satisfying the threshold curvature and the threshold curvature rate, calculate a first path length of the first acquisition path and a second path length of the second acquisition path;

compare the first path length and the second path length to determine which acquisition path is shorter;
cause storage of a shorter acquisition path; and
means for steering to steer the vehicle as it follows the shorter acquisition path.

12. The apparatus of claim 11, wherein the input data includes at least one of the current position of the vehicle, a current heading of the vehicle, a current speed of the vehicle, a wheel angle of the vehicle, a wheel angle rate of the vehicle, or a wheelbase of the vehicle.

13. The apparatus of claim 11, wherein the means for obtaining obtains the input data from at least one of a sensor associated with the vehicle or a global positioning system (GPS) of the vehicle.

14. The apparatus of claim 11, wherein the means for generating is to copy a portion of the target path and add the copied portion to an end of the shorter acquisition path.

15. The apparatus of claim 11, further including means for adjusting to adjust the current position of the vehicle by adding a runway to the current position, the runway based on a current curvature of the vehicle.

* * * * *